US009409731B2

(12) United States Patent
Digmann et al.

(10) Patent No.: US 9,409,731 B2
(45) Date of Patent: Aug. 9, 2016

(54) HEAD CURTAINS FOR DOCK SHELTERS OR DOCK SEALS

(71) Applicants: Charles Digmann, Dubuque, IA (US); Gary Borgerding, Dubuque, IA (US); Timothy J. Schmidt, Dubuque, IA (US)

(72) Inventors: Charles Digmann, Dubuque, IA (US); Gary Borgerding, Dubuque, IA (US); Timothy J. Schmidt, Dubuque, IA (US)

(73) Assignee: RITE-HITE HOLDING CORPORATION, Milwaukee, WI (US)

( * ) Notice: Subject to any disclaimer, the term of this patent is extended or adjusted under 35 U.S.C. 154(b) by 0 days.

(21) Appl. No.: 14/701,176

(22) Filed: Apr. 30, 2015

(65) Prior Publication Data

US 2015/0232291 A1 Aug. 20, 2015

Related U.S. Application Data

(63) Continuation of application No. 13/894,077, filed on May 14, 2013, now Pat. No. 9,079,713, which is a continuation of application No. 13/656,212, filed on Oct. 19, 2012, now Pat. No. 8,458,960, which is a continuation of application No. 12/821,973, filed on Jun. 23, 2010, now Pat. No. 8,327,587, which is a continuation-in-part of application No. 12/129,159, filed on May 29, 2008, now Pat. No. 8,042,307.

(51) Int. Cl.
*E06B 3/80* (2006.01)
*B65G 69/00* (2006.01)
*E04H 14/00* (2006.01)

(52) U.S. Cl.
CPC .............. *B65G 69/008* (2013.01); *E04H 14/00* (2013.01); *E06B 3/80* (2013.01)

(58) Field of Classification Search
CPC .......... B65G 69/008; E04H 14/00; E06B 3/80
USPC ...................... 52/2.12, 2.13, 173.2, 174, 211
See application file for complete search history.

(56) References Cited

U.S. PATENT DOCUMENTS

| 2,565,393 | A | 8/1951 | Oswald |
| 2,892,463 | A | 6/1959 | Frommelt et al. |
| 3,095,886 | A | 7/1963 | Frommelt et al. |
| 3,181,204 | A | 5/1965 | Muessel |

(Continued)

FOREIGN PATENT DOCUMENTS

| EP | 0069093 | 1/1983 |
| EP | 0229399 | 7/1990 |

(Continued)

OTHER PUBLICATIONS

State Intellectual Property Office of the People's Republic of China, "Notice of Completing Formalities for Patent Registration," issued in connection with Chinese Patent Application No. 201310006860.1, dated Mar. 18, 2015, 2 pages.

(Continued)

*Primary Examiner* — Patrick Maestri
(74) *Attorney, Agent, or Firm* — Hanley, Flight and Zimmerman, LLC

(57) ABSTRACT

Head curtains for dock shelters or dock seals are disclosed. An example dock apparatus disclosed herein includes a curtain to be suspended from a support panel and configured to be engaged by the vehicle. The curtain has a plurality of pleats overlapping a plurality of loops such that the plurality of loops is positioned between a vehicle-engaging surface of the curtain and the plurality of pleats.

17 Claims, 20 Drawing Sheets

(56) References Cited

U.S. PATENT DOCUMENTS

| | | | |
|---|---|---|---|
| 3,181,205 A | 5/1965 | Frommelt et al. | |
| 3,230,675 A | 1/1966 | Frommelt et al. | |
| 3,303,615 A | 2/1967 | O'Neal | |
| 3,322,132 A | 5/1967 | Rieder et al. | |
| 3,352,314 A | 11/1967 | Frommelt et al. | |
| 3,375,625 A | 4/1968 | Edkins et al. | |
| 3,391,503 A | 7/1968 | O'Neal | |
| 3,403,489 A | 10/1968 | Frommelt et al. | |
| 3,538,655 A | 11/1970 | Frommelt et al. | |
| 3,557,508 A | 1/1971 | Frommelt et al. | |
| 3,638,667 A | 2/1972 | Frommelt et al. | |
| 3,653,155 A | 4/1972 | de Brunyn, Jr. et al. | |
| 3,653,173 A | 4/1972 | Frommelt et al. | |
| 3,665,997 A | 5/1972 | Smith et al. | |
| 3,699,733 A | 10/1972 | Frommelt et al. | |
| 3,772,839 A | 11/1973 | Timbers | |
| 3,792,559 A | 2/1974 | Frommelt et al. | |
| 3,816,867 A | 6/1974 | Shirzad et al. | |
| 3,826,049 A | 7/1974 | Frommelt et al. | |
| RE28,391 E | 4/1975 | Frommelt et al. | |
| 3,875,954 A | 4/1975 | Frommelt et al. | |
| 3,915,183 A | 10/1975 | Frommelt | |
| 3,934,380 A | 1/1976 | Frommelt et al. | |
| 3,935,684 A | 2/1976 | Frommelt et al. | |
| 3,939,614 A | 2/1976 | Frommelt et al. | |
| 3,994,103 A | 11/1976 | Ouellet | |
| 4,015,380 A * | 4/1977 | Chalfant | B65G 69/008 52/173.2 |
| 4,045,925 A | 9/1977 | O'Neal | |
| 4,262,458 A | 4/1981 | O'Neal | |
| 4,322,923 A | 4/1982 | O'Neal | |
| 4,365,452 A | 12/1982 | Fillman et al. | |
| 4,381,631 A | 5/1983 | Frommelt | |
| 4,389,821 A | 6/1983 | O'Neal | |
| 4,554,768 A | 11/1985 | Srajer | |
| 4,601,142 A | 7/1986 | Frommelt | |
| 4,671,029 A | 6/1987 | Bennett et al. | |
| 4,718,207 A | 1/1988 | Frommelt | |
| 4,750,299 A | 6/1988 | Frommelt et al. | |
| 4,799,341 A | 1/1989 | Frommelt et al. | |
| 4,805,362 A | 2/1989 | Frommelt et al. | |
| 4,821,468 A | 4/1989 | Moore | |
| 4,873,800 A | 10/1989 | Frommelt et al. | |
| 4,873,801 A | 10/1989 | Winters | |
| 5,007,211 A | 4/1991 | Ouellet | |
| 5,055,335 A | 10/1991 | Wicks | |
| 5,109,639 A | 5/1992 | Moore | |
| 5,125,169 A * | 6/1992 | Bader | A47F 8/00 223/78 |
| 5,125,196 A | 6/1992 | Moody | |
| 5,622,016 A | 4/1997 | Frommelt et al. | |
| 5,675,945 A | 10/1997 | Giuliani et al. | |
| 5,785,105 A | 7/1998 | Crider et al. | |
| 5,927,025 A | 7/1999 | Brockman et al. | |
| 5,996,291 A | 12/1999 | Styba et al. | |
| 6,205,721 B1 | 3/2001 | Ashelin et al. | |
| 6,854,224 B2 | 2/2005 | Thill et al. | |
| 7,185,463 B2 | 3/2007 | Borgerding | |
| 8,042,307 B2 | 10/2011 | Digmann et al. | |
| 8,112,949 B2 * | 2/2012 | Eungard | B65G 69/008 52/173.1 |
| 8,327,587 B2 | 12/2012 | Digmann et al. | |
| 8,458,960 B2 | 6/2013 | Digmann et al. | |
| 9,079,713 B2 | 7/2015 | Digmann et al. | |
| 2002/0112418 A1 | 8/2002 | Thill et al. | |
| 2003/0140579 A1 | 7/2003 | Hoffmann et al. | |
| 2007/0175116 A1 | 8/2007 | Borgerding | |
| 2009/0077906 A1 | 3/2009 | Tramonte et al. | |
| 2009/0293371 A1 | 12/2009 | Digmann et al. | |
| 2010/0269427 A1 | 10/2010 | Digmann et al. | |
| 2013/0047526 A1 | 2/2013 | Digmann et al. | |

FOREIGN PATENT DOCUMENTS

| | | |
|---|---|---|
| EP | 0567441 | 10/1993 |
| EP | 1174063 | 1/2002 |
| EP | 1550624 | 7/2005 |
| GB | 4194 | 0/1907 |
| WO | WO9303989 | 3/1993 |
| WO | WO9943583 | 9/1999 |
| WO | WO2009146237 | 12/2009 |

OTHER PUBLICATIONS

State Intellectual Property Office of the People's Republic of China, "Notice of Granting Patent Right for Invention and Search Report," issued in connection with Chinese Patent Application No. 201310006860.1, dated Mar. 18, 2015, 6 pages.

European Patent Office, "Decision to grant a European patent pursuant to Article 97(1) EPC," issued in connection with European Patent Application No. 11726588.4, dated Jan. 22, 2015, 1 page.

Canadian Intellectual Property Office, "Notice of Allowance," issued in connection with Canadian Patent Application No. 2,817,032, dated Jan. 13, 2015, 1 page.

State Intellectual Property Office of the People's Republic of China, "Notice of Completing Formalities for Patent Registration," issued in connection with Chinese Patent Application No. 201310006972.7, dated Feb. 26, 2015, 4 pages.

State Intellectual Property Office of the People's Republic of China, "Second Office Action," issued in connection with Chinese Patent Application No. 201180036028.5, dated Feb. 11, 2015, 8 pages.

State Intellectual Property Office of the P.R. of China. "First Office Action," issued in connection with Chinese Patent Application No. 201310006860.1, on Jul. 1, 2014 (8 pages).

State Intellectual Property Office of the P.R. of China, "First Office Action," issued in connection with Chinese Patent Application No. 201310006972.7, on Jul. 3, 2014 (7 pages).

European Patent Office, "Intent to Grant," issued in connection with European Patent Application No. 11726588.4, on Aug. 26, 2014 (8 pages).

State Intellectual Property Office of the People's Republic of China, "Office Action," issued in connection with Chinese Patent application No. 201180036028.5, dated Mar. 26, 2014, 10 pages.

Canadian Intellectual Property Office, Requisition by the Examiner, issued in connection with Canadian patent application No. 2,803,563, dated Jan. 21, 2014, 2 pages.

European Patent Office, "Communication Pursuant to Article 94(3) EPC," issued in connection with European patent application No. 11 726 588.4-1708, dated Feb. 14, 2014, 3 pages.

Canadian Intellectual Property Office, Requisition by the Examiner, issued in connection with Canadian patent application No. 2,817,032, dated Apr. 7, 2014, 3 pages.

Mexican Institute of Intellectual Property, "Office Action," issued in connection with Mexican Patent Application No. MX/a/2010/013028 on Jul. 16, 2013, 4 pages.

Mexican Institute of Intellectual Property, "Notice of Allowance," issued in connection with Mexican Patent Application No. MX/a/2010/013028 on Oct. 23, 2013, 2 pages.

International Searching Authority, "International Search Report," issued in connection with International Application Serial No. PCT/US2009/042574, mailed on Jul. 20, 2009, 5 pages.

International Searching Authority, "Written Opinion of the International Searching Authority," issued in connection with International Application Serial No. PCT/US2009/042574, mailed on Jul. 20, 2009, 6 pages.

The United States Patent and Trademark Office, "Requirement for Restriction/Election," issued in connection with U.S. Appl. No. 12/129,159 on Apr. 12, 2010, 6 pages.

The United States Patent and Trademark Office, "Non-Final Office Action," issued in connection with U.S. Appl. No. 12/129,159 on Jun. 23, 2010, 28 pages.

International Bureau, "International Preliminary Report on Patentability," issued in connection with International Application Serial No. PCT/US2009/042574, mailed Dec. 9, 2010, 7 pages.

(56) References Cited

OTHER PUBLICATIONS

The United States Patent and Trademark Office, "Notice of Allowance and Fees Due," issued in connection with U.S. Appl. No. 12/129,159 on Mar. 1, 2011, 17 pages.
European Patent Office, "Office Communication," issued in connection with European Application Serial No. 09 755 599.9, on May 31, 2011, 3 pages.
The United States Patent and Trademark Office, "Notice of Allowance and Fees Due," issued in connection with U.S. Appl. No. 12/129,159 on Jun. 22, 2011, 21 pages.
The United States Patent and Trademark Office, "Notice of Allowance and Fees Due," issued in connection with U.S. Appl. No. 12/129,159 on Sep. 8, 2011, 9 pages.
The United States Patent and Trademark Office, "Issue Notification," issued in connection with U.S. Appl. No. 12/129,159 on Oct. 5, 2011, 1 pages.
International Searching Authority, "International Search Report," issued in connection with International Application Serial No. PCT/US2011/039449, mailed on Oct. 28, 2011, 8 pages.
International Searching Authority, "Written Opinion of the International Searching Authority," issued in connection with International Application Serial No. PCT/US2011/039449, mailed on Oct. 28, 2011, 6 pages.
European Patent Office, "Office Communication Regarding Grant Notification," issued in connection with European Patent Application Serial No. 09 755 599.9, mailed on Dec. 15, 2011, 29 pages.
Canadian Patent Office, "Office Action," issued in connection with Canadian Application Serial No. 2,726,218, on Feb. 28, 2012, 4 pages.
The United States Patent and Trademark Office, "Requirement for Restriction/Election," issued in connection with U.S. Appl. No. 12/821,973 on May 1, 2012, 6 pages.
European Patent Office, "Decision to Grant," issued in connection with European Application Serial No. 09 755 599.9, on Jun. 14, 2012, 1 page.
The United States Patent and Trademark Office, "Notice of Allowance and Fees Due," issued in connection with U.S. Appl. No. 12/821,973 on Aug. 6, 2012, 47 pages.
State Intellectual Property Office of P.R. China, "First Office Action," issued in connection with Chinese Application Serial No. 200980119859.1, issued on Aug. 31, 2012, 19 pages.
Canadian Patent Office, "Notice of Allowance," issued in connection with Canadian Application Serial No. 2,726,218, issued Dec. 13, 2012, 1 pages.
International Bureau, "International Preliminary Report on Patentability," issued in connection with International Application Serial No. PCT/US2011/039449, mailed Jan. 10, 2013, 7 pages.
The United States Patent and Trademark Office, "Notice of Allowance and Fees Due," issued in connection with U.S. Appl. No. 13/656,212 on Feb. 15, 2013, 26 pages.
The United States Patent and Trademark Office, "Issue Notification," issued in connection with U.S. Appl. No. 12/821,973 on Nov. 21, 2012, 1 pages.
The United States Patent and Trademark Office, "Issue Notification," issued in connection with U.S. Appl. No. 13/656,212 on May 22, 2013, 1 pages.
European Patent Office, "Communication Pursuant to Rules 161 (1) and 162 EPC," issued in connection with European Patent Application No. 0975599.9-1261 on Jan. 11, 2011, 2 pages.
European Patent Office, "Communication Pursuant to Rules 161 (1) and 162 EPC," issued in connection with European Patent Application No. 11726588.4-1708 on Feb. 19, 2013, 2 pages.
Canadian Intellectual Property Office, "Notice of Allowance," issued in connection with Application No. 2,803,563, Oct. 29, 2014, 1 page.
United States Patent and Trademark Office, "Requirement for Restriction/Election," issued in connection with U.S. Appl. No. 13/894,077, Jul. 24, 2013, 6 pages.
United States Patent and Trademark Office, "Non-Final Office Action," issued in connection with U.S. Appl. No. 13/894,077, Sep. 12, 2013, 17 pages.
United States Patent and Trademark Office, "Final Office Action," issued in connection with U.S. Appl. No. 13/894,077, Feb. 25, 2014, 25 pages.
United States Patent and Trademark Office, "Advisory Action," issued in connection with U.S. Appl. No. 13/894,077, Apr. 29, 2014, 14 pages.
United States Patent and Trademark Office, "Non-Final Office Action," issued in connection with U.S. Appl. No. 13/894,077, Jul. 14, 2014, 19 pages.
United States Patent and Trademark Office, "Final Office Action," issued in connection with U.S. Appl. No. 13/894,077, Dec. 17, 2014, 18 pages.
United States Patent and Trademark Office, "Notice of Allowance," issued in connection with U.S. Appl. No. 13/894,077, Mar. 6, 2015, 23 pages.
United States Patent and Trademark Office, "Supplemental Notice of Allowability," issued in connection with U.S. Appl. No. 13/894,077, Apr. 21, 2015, 4 pages.
United States Patent and Trademark Office, "Supplemental Notice of Allowability," issued in connection with U.S. Appl. No. 13/894,077, Jun. 16, 2015, 6 pages.
Canadian Intellectual Property Office, "Office Action," issued in connection with Application No. 2,857,882, Oct. 27, 2015, 3 pages.
Canadian Intellectual Property Office, "Notice of Allowance," issued in connection with Application No. 2,857,895, Nov. 10, 2015, 1 page.

\* cited by examiner

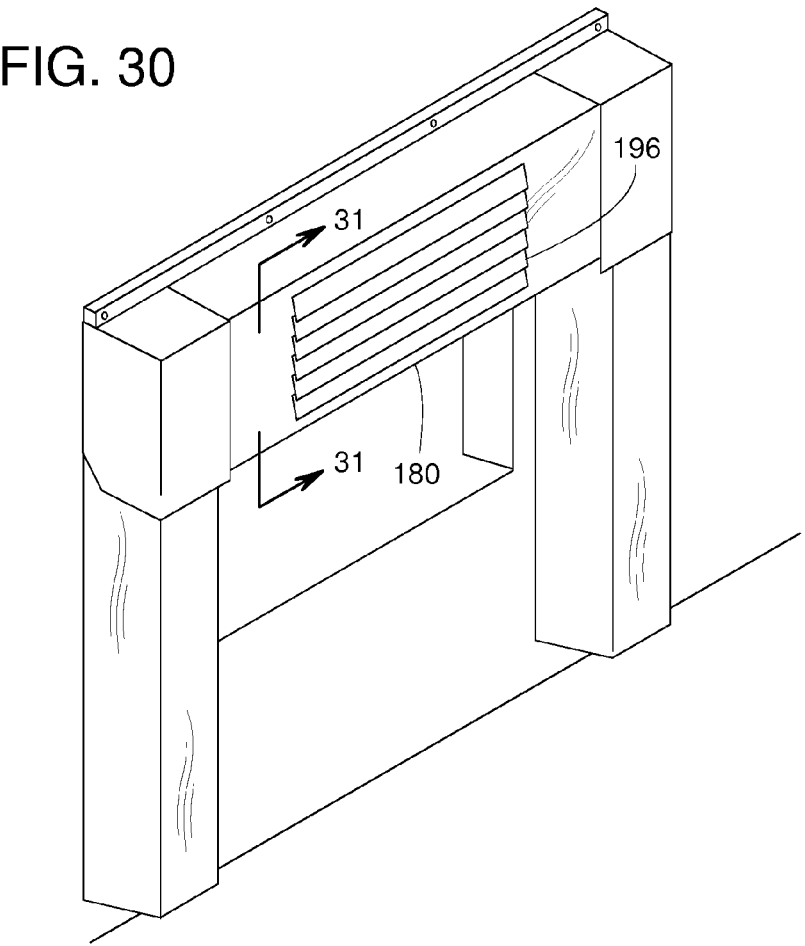
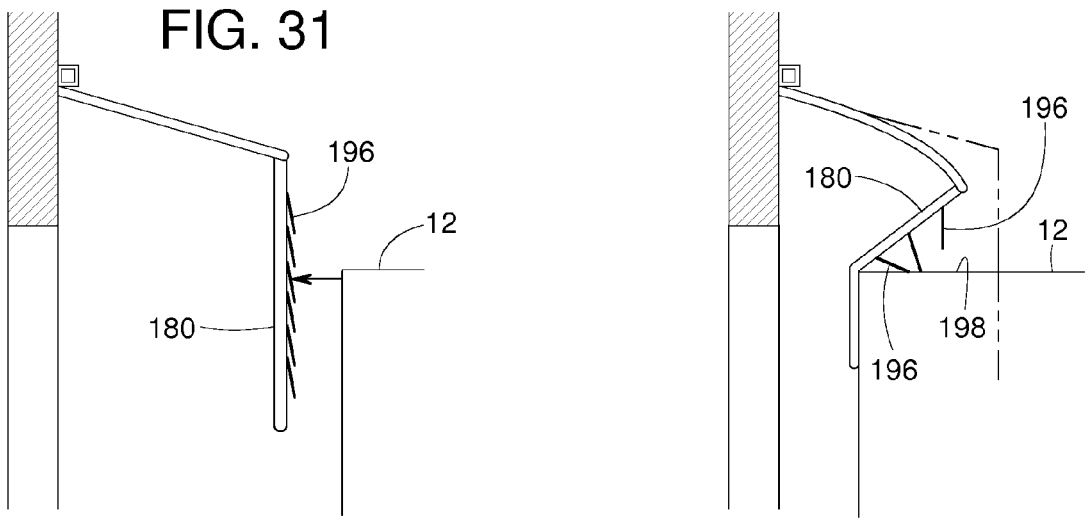

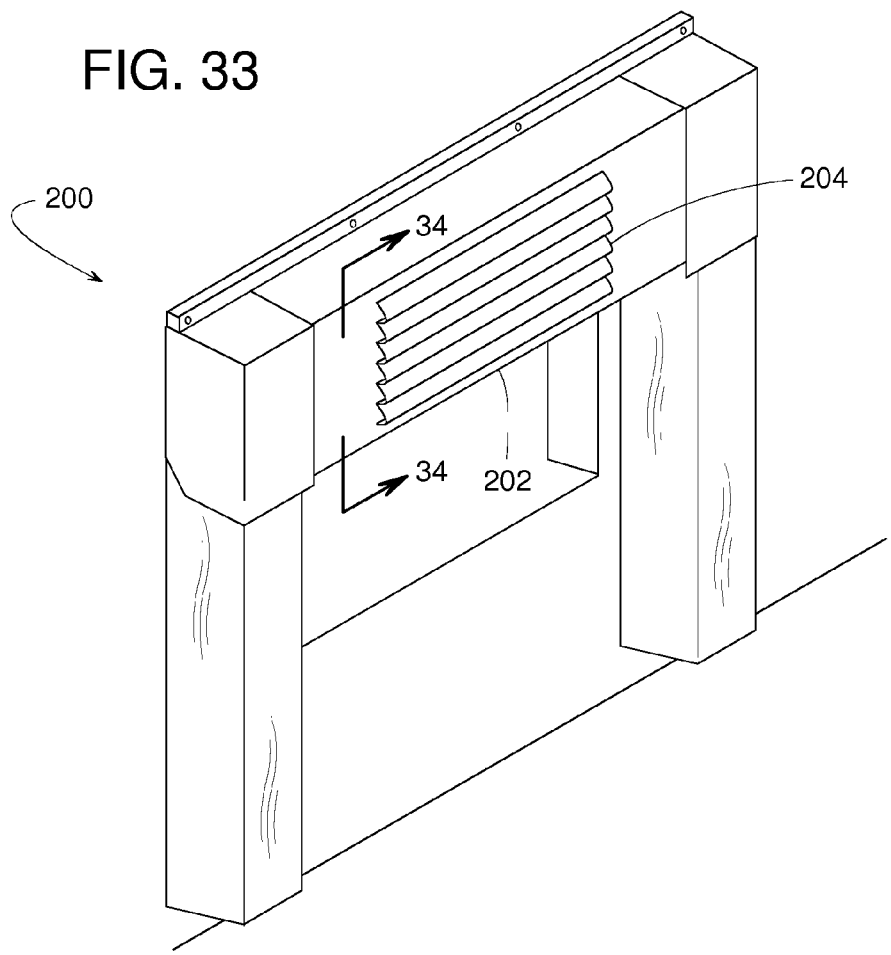
FIG. 33
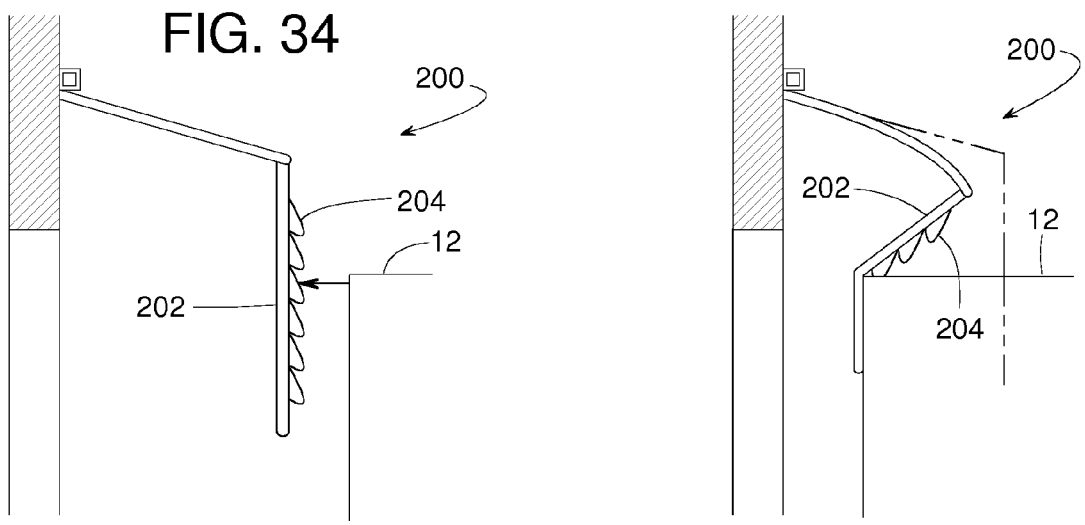
FIG. 34
FIG. 35

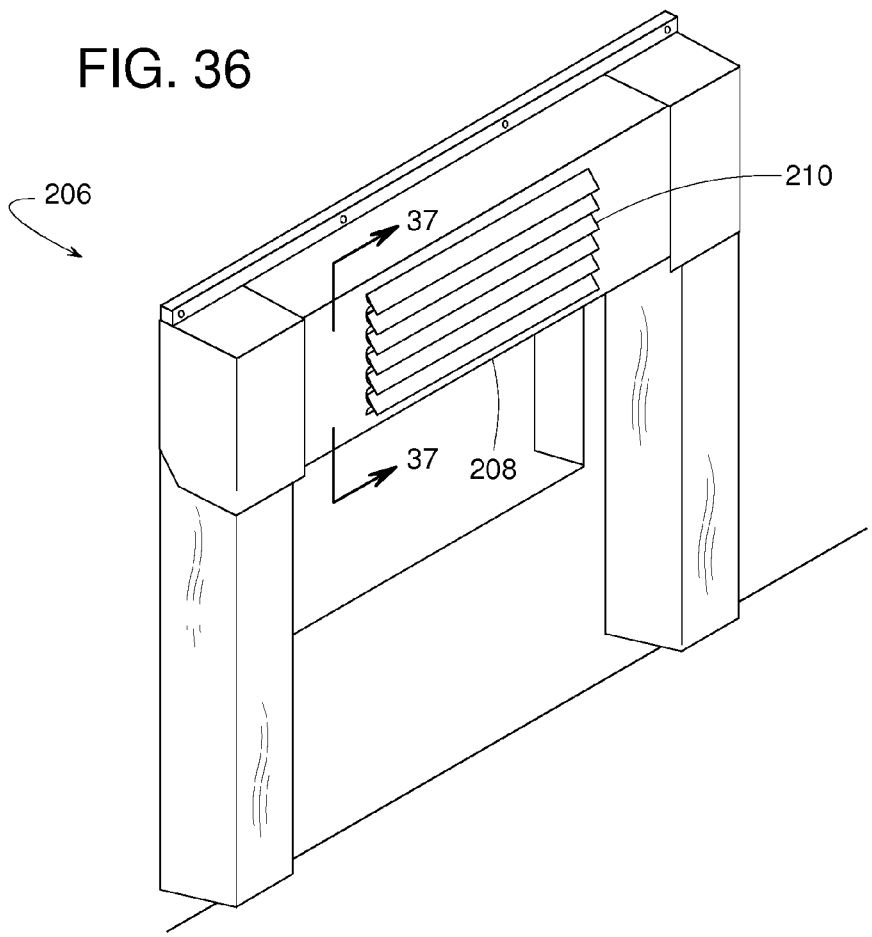
FIG. 36
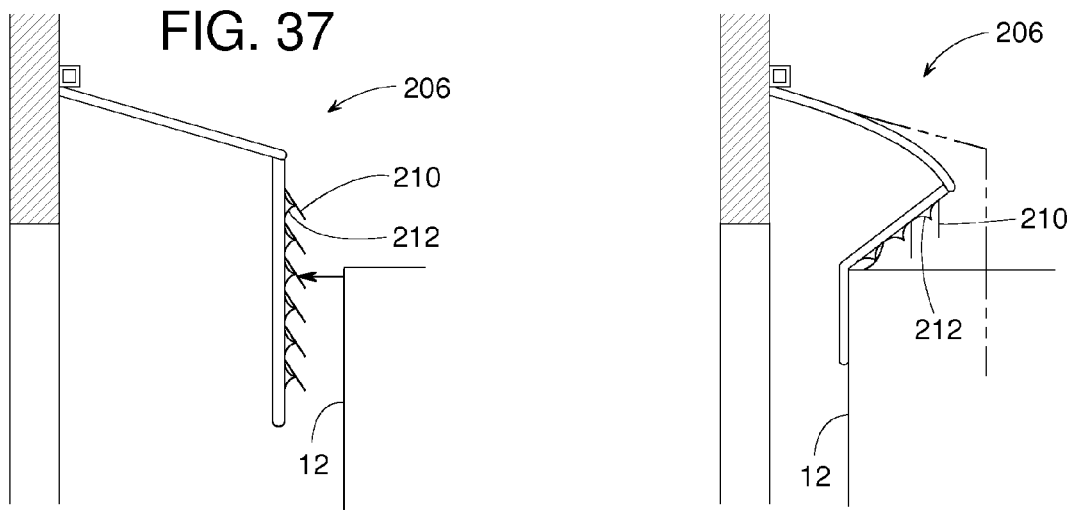
FIG. 37
FIG. 38

HEAD CURTAINS FOR DOCK SHELTERS OR DOCK SEALS

CROSS-REFERENCE TO RELATED APPLICATIONS

This patent arises from a continuation of U.S. application Ser. No. 13/894,077, filed on May 14, 2013, entitled "Head Curtains for Dock Shelters or Dock Seals," which is a continuation of U.S. patent application Ser. No. 13/656,212, filed on Oct. 19, 2012, entitled "Head Curtains for Dock Shelters or Dock Seals," now U.S. Pat. No. 8,458,960, which is a continuation of U.S. patent application Ser. No. 12/821,973, filed on Jun. 23, 2010, now U.S. Pat. No. 8,327,587, which is a continuation-in-part of U.S. patent application Ser. No. 12/129,159, filed on May 29, 2008, now U.S. Pat. No. 8,042, 307. U.S. patent application Ser. Nos. 13/894,077, 13/656, 212, 12/821,973 and 12/129,159 are incorporated herein by reference in their entireties.

FIELD OF THE DISCLOSURE

The subject disclosure generally pertains to loading dock shelters and dock seal systems, and more specifically, to head curtains for such systems.

BACKGROUND

Trucks having open rear cargo bays are typically backed into alignment with a loading dock or other doorway of a building to facilitate loading and unloading of the vehicle. A significant gap is usually created between the rear of the truck and the face of the building, which exposes the interiors of the building and the truck to the outside environment during loading and unloading. Such gaps can be at least partially sealed by installing either a loading dock shelter or a loading dock seal around the perimeter of the doorway.

To seal or shelter the vehicle's rear vertical edges, dock shelters and dock seals usually have some type of lateral weather barrier installed along the side edges of the doorway. For dock shelters, the weather barrier usually shelters or seals against the vertical sides of the vehicle's trailer. An example of such an approach is shown in U.S. Pat. No. 3,322,132. Dock seals, on the other hand, usually have lateral weather barriers that are resiliently compressible for conformingly sealing against the vertical rear edges of the vehicle. An example of such an approach is shown in U.S. Pat. No. 5,125, 196. Regardless of the structural design of the lateral weather barrier, the upper rear edge of the vehicle is often sealed or sheltered by a head curtain that drapes down onto the top of the vehicle as the vehicle backs into the dock.

If the head curtain is extra long to accommodate a broad range of vehicle heights, the dock shelter or dock seal might include means for vertically retracting the curtain so that the curtain length is appropriate for the height of the particular vehicle at the dock. Thus, the curtain needs to be flexible not only for deflecting in reaction to the vehicle backing into the dock, but also for enabling the curtain to be retracted. Such flexibility or compliance, however, can weaken or hinder the curtain's ability to forcibly seal against the rear upper edge of the vehicle. Thus, instead of the curtain applying sealingly tight pressure against the upper edge of the vehicle, a pliable curtain readily deflects backwards toward the doorway of the dock.

BRIEF DESCRIPTION OF THE DRAWINGS

FIG. 30 is a perspective view of another example dock apparatus described herein.

FIG. 31 is a cross-sectional view of the example dock apparatus of FIG. 30 taken along line 31-31 of FIG. 30.

FIG. 32 is a cross-sectional view similar to FIG. 31 but showing the example dock apparatus of FIG. 31 being engaged by a vehicle.

FIG. 33 is a perspective view of another example dock apparatus described herein.

FIG. 34 is a cross-sectional view of the example dock apparatus of FIG. 33 taken along line 34-34 of FIG. 33.

FIG. 35 is a cross-sectional view similar to FIG. 34 but showing the example dock apparatus of FIGS. 33 and 34 being engaged by a vehicle.

FIG. 36 is a perspective view of another example dock apparatus described herein.

FIG. 37 is a cross-sectional view of the example dock apparatus of FIG. 36 taken along line 37-37 of FIG. 36.

FIG. 38 is a cross-sectional view similar to FIG. 37 but showing the example dock apparatus of FIG. 37 being engaged by a vehicle.

DETAILED DESCRIPTION

Figure 1:
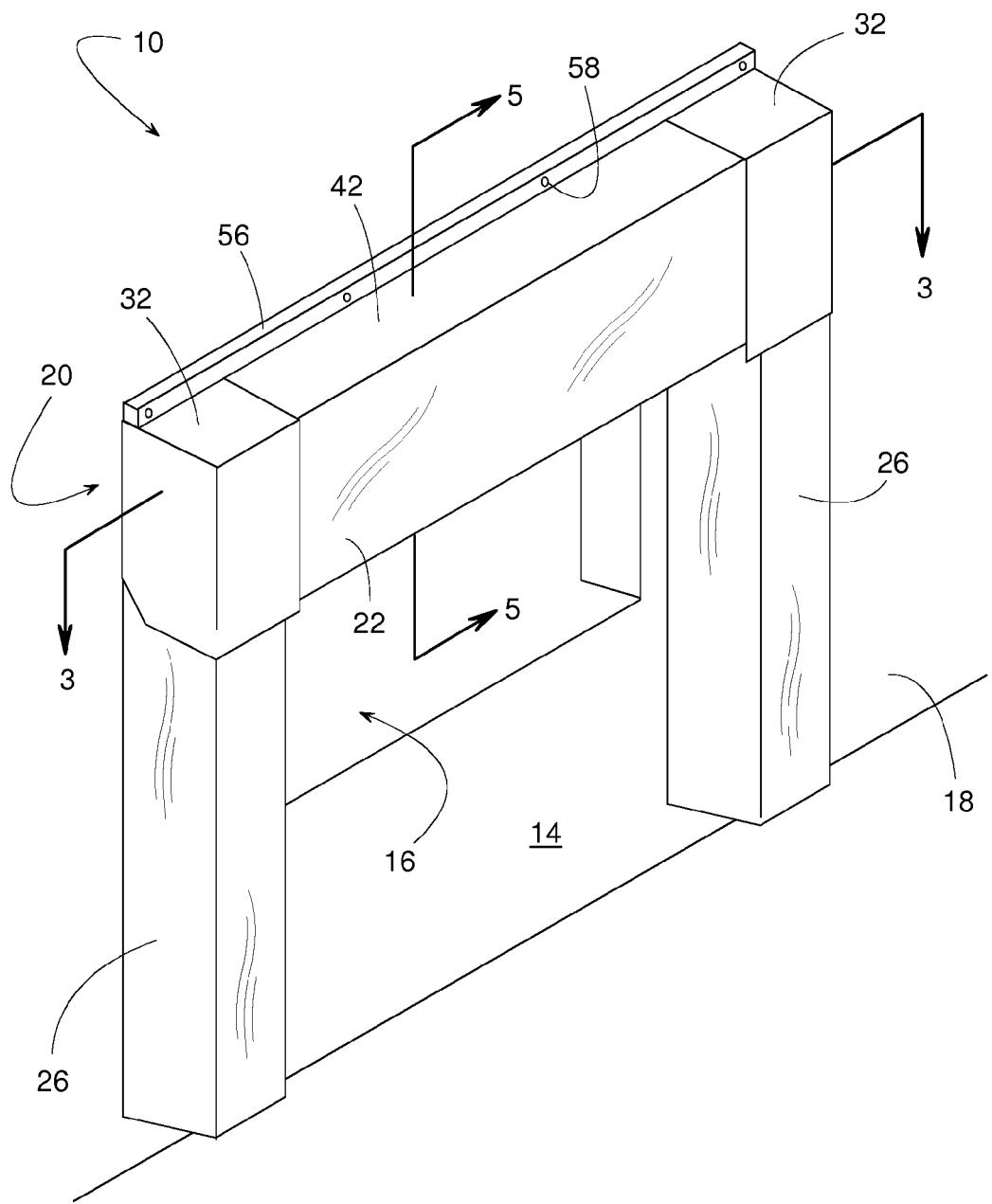
FIG. 1 is a perspective view of an example dock apparatus described herein.

FIGS. 1-6 show a loading dock apparatus 10 that helps seal and/or shelter the rear access opening of a truck/trailer vehicle 12 at a loading dock 14. Dock 14 includes a doorway 16 in a wall 18 of a building. The dock apparatus 10 provides a barrier to weather and other elements as the vehicle's cargo is being loaded or unloaded at the doorway. To accommodate vehicles of various heights, dock apparatus 10 includes a head curtain assembly 20 with a retractable curtain 22 that seals along the vehicle's upper rear edge.

To seal or shelter the vehicle's rear side edges, an upper sealing assembly illustratively in the form of a head curtain assembly 20 could be used with a dock shelter that includes lateral weather barriers or side panels that are relatively rigid and incompressible. Head curtain assembly 20, however, is particularly suited for a dock seal 24 having lateral weather barriers in the form of resiliently compressible side pads 26, thus assembly 20 will be described and illustrated with reference to dock seal 24.

Figure 2:
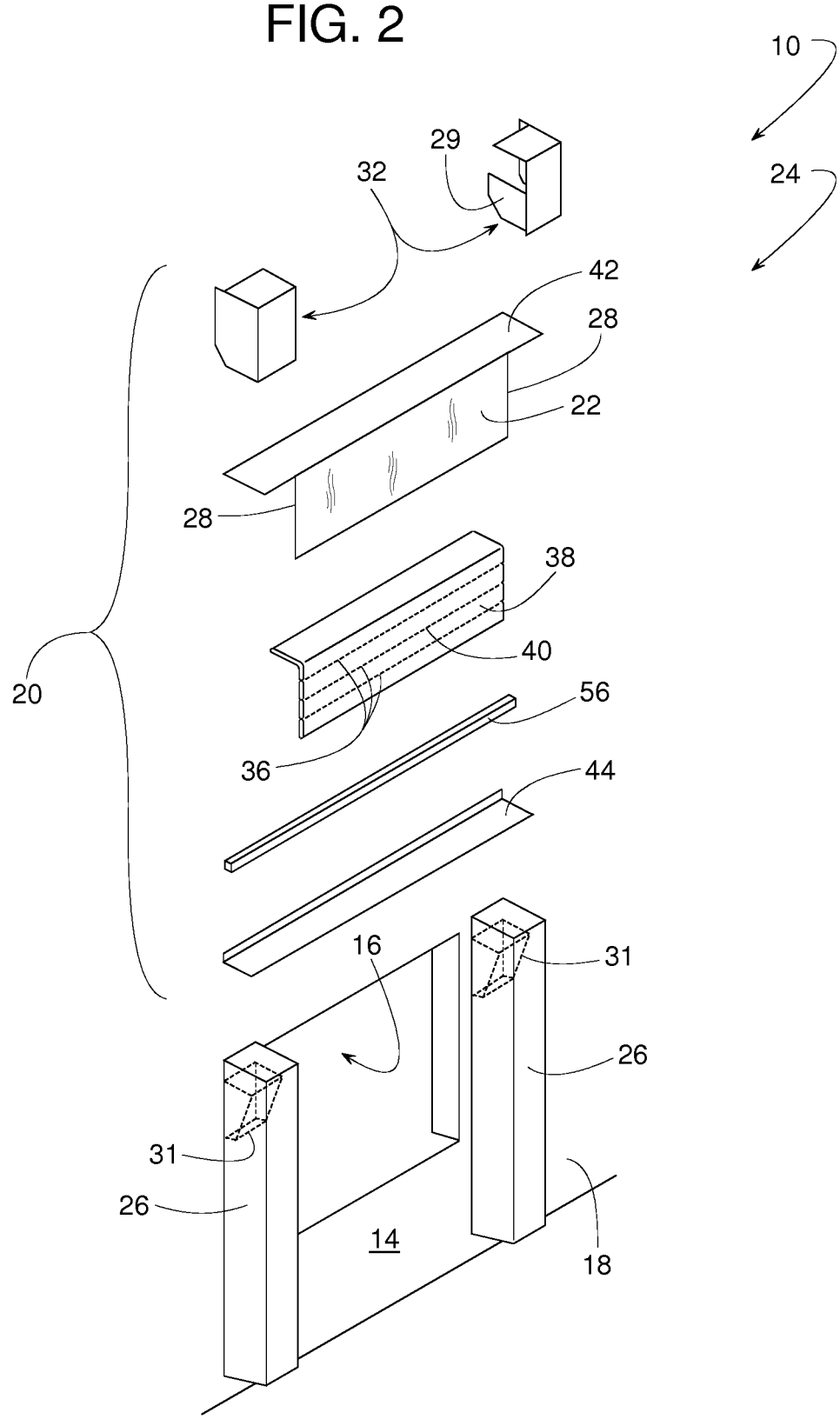
FIG. 2 is an exploded perspective view of the example dock apparatus of FIG. 1.
Figure 3:
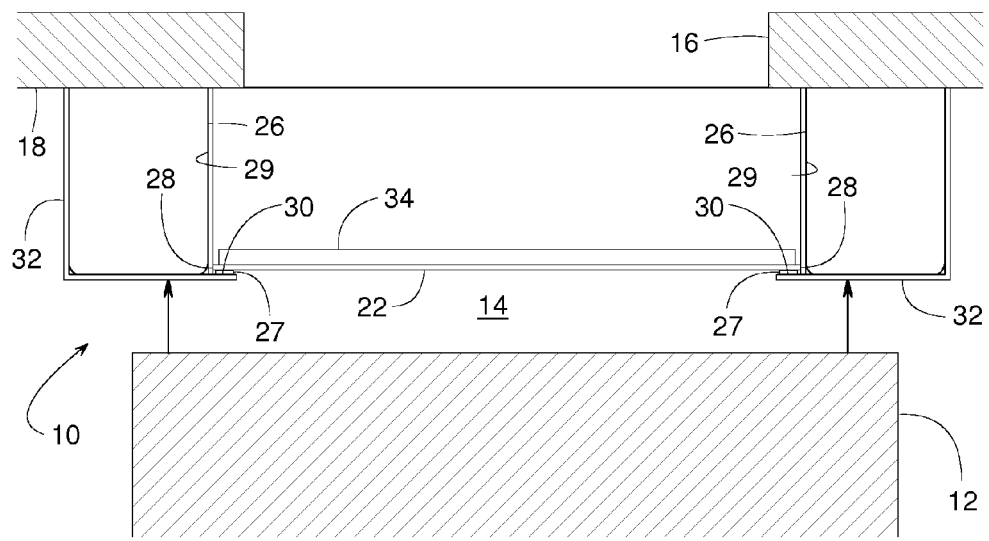
FIG. 3 is a cross-sectional view of the example dock apparatus of FIG. 1 taken along line 3-3 of FIG. 1.

Lateral edges 28 of curtain 22 preferably seal against the inner surfaces of side pads 26 (as shown in FIG. 3) and/or seal against an inner surface 30 of a pair of flexible boots 32 that protect the upper ends of side pads 26. A touch-and-hold fastener 27 (e.g., a fabric hook-and-loop fastener such as VELCRO™) can help seal edges 28 to surface 30. As an alternative to conventional windstraps, an inner flexible panel 29 on boot 32 is coupled to wall 18 to help prevent vehicle 12 from pulling curtain assembly 20 away from wall 18 as vehicle 12 departs dock 14. The connection 27 between edges 28 and surface 30 also helps prevent curtain assembly 20 from uncontrolled movement in strong winds when not engaged by a vehicle. To minimize wear, side pads 26 may include one or more cavities 31 (FIG. 2) that reduce the compressive forces in certain localized areas, such as in the area behind boots 32.

Figure 4:
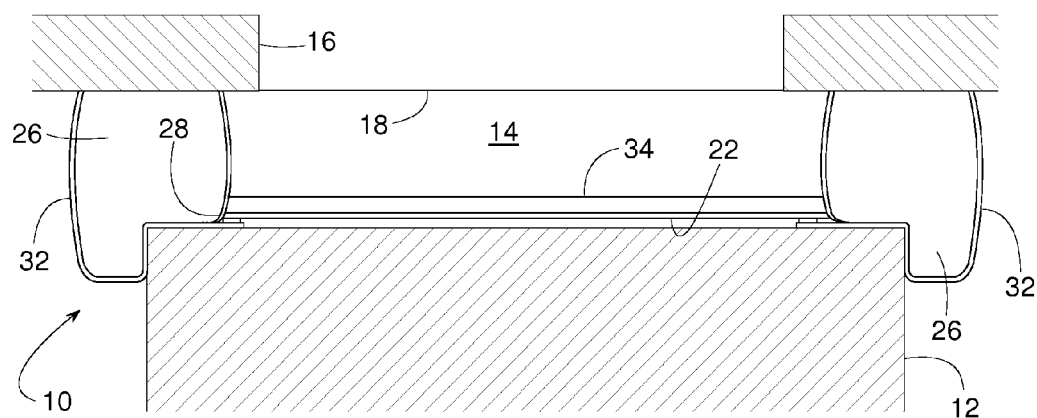
FIG. 4 is a cross-sectional view similar to FIG. 3 but showing a vehicle engaging the dock apparatus of FIGS. 1, 2, and 3.

When side pads 26 are compressed by the rear end of vehicle 12, as shown in FIG. 4, pads 26 tend to bulge and push inward against the lateral edges 28. To maintain a positive seal at edges 28, a resiliently compressible foam panel 34 (covered by item 38) may be included to increase the rigidity or stiffness (e.g., horizontal rigidity) to curtain 22. In addition to improved sealing at edges 28, the curtain's increased horizontal stiffness in conjunction with pads 26 bulging inward firmly retains curtain 22 between pads 26, and the bulging sections forcibly hold curtain 22 sealingly tight against the rear upper edge of vehicle 12.

Figure 5:
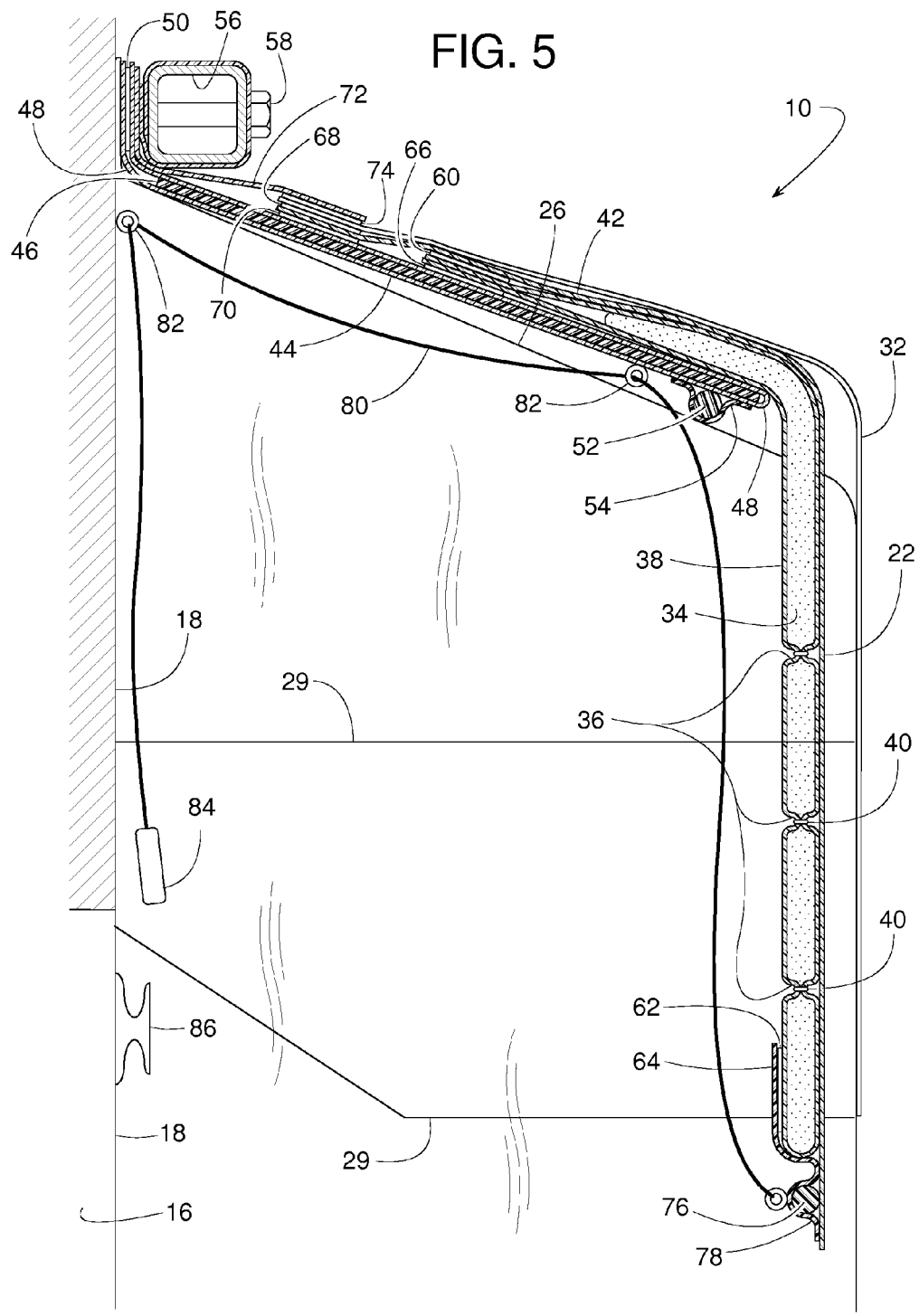
FIG. 5 is a cross-sectional view of the example dock apparatus of FIG. 1 taken along line 5-5 of FIG. 1.
Figure 6:
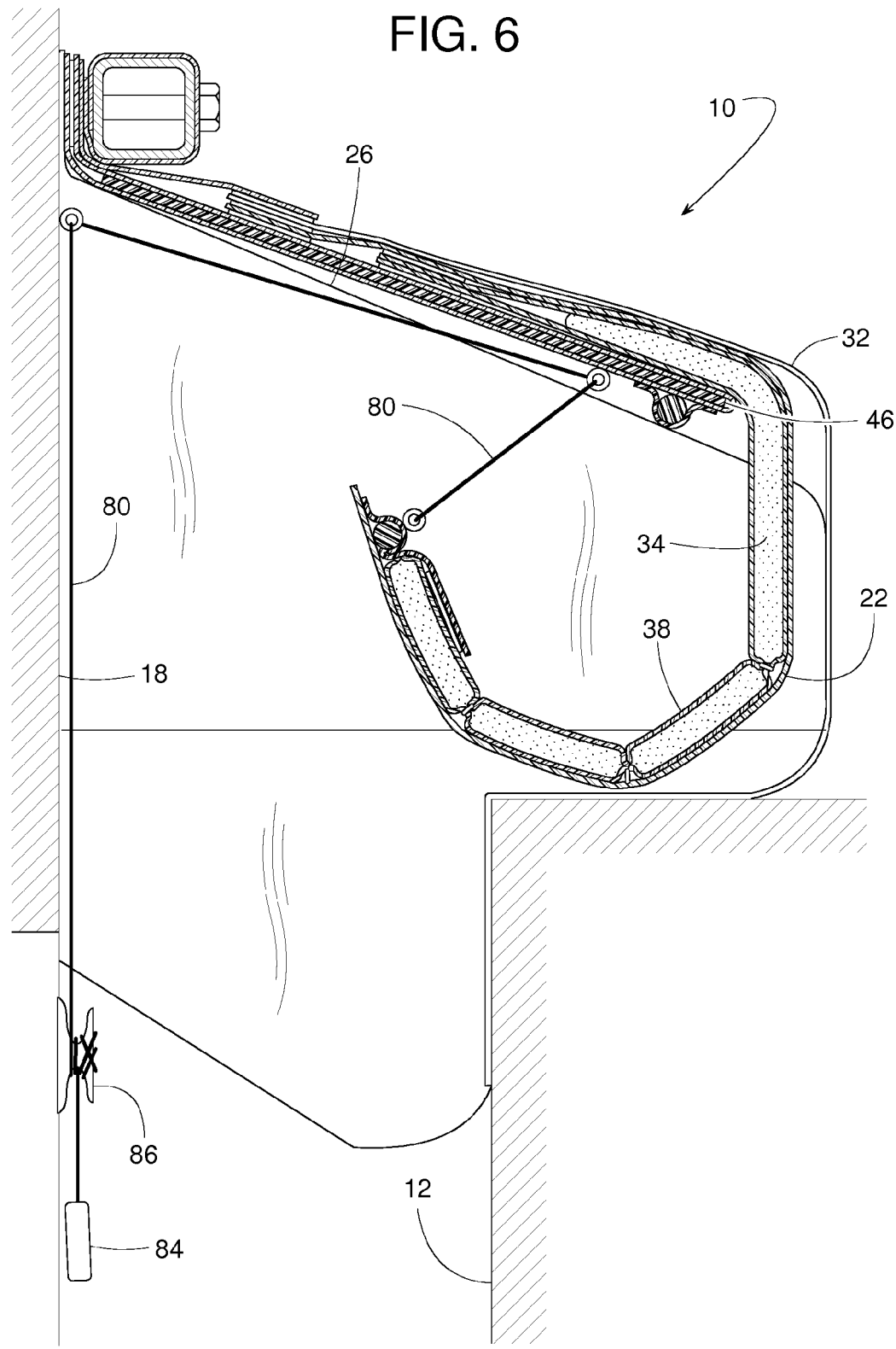
FIG. 6 is a cross-sectional view similar to FIG. 5 but showing a head curtain assembly of the dock apparatus of FIGS. 1-5 in a refracted position.

To ensure that the horizontal stiffness does not hinder the curtain's ability to retract vertically from the position of FIG. 5 to that of FIG. 6, foam panel 34 includes a series of compressed indentations 36 or bending creases that render panel 34 more flexible about a horizontal axis than about a vertical axis. Indentations 36 can be created or formed by sewing panel 34 to a pliable cover 38, in which the sewing process produces a plurality of stitches 40 that holds the indentations in compression. Other methods of producing compressed indentations 36 include, but are not limited to, localized ultrasonic or heat sealing of cover 38 to foam panel 34 or localized ultrasonic or heat sealing of foam panel 34 to itself. Regardless of how indentations 36 are formed, maintaining foam panel 34 as a unitary piece, as opposed to a plurality of segments, simplifies manufacturability and provides a neat, clean appearance.

The assembly of dock apparatus 10 is perhaps best understood with reference to FIGS. 2 and 5. Side pads 26 can be attached to wall 18 using any suitable means including, but not limited to, methods that are well known to those of ordinary skill in the art. To support foam panel 34, curtain 22, and an upper sheet 42 extending from curtain 22, the head curtain assembly 20 of the illustrated example includes a resiliently crushable support panel 44 atop side pads 26. In some examples, support panel 44 comprises a semi-rigid polymeric sheet 46 (e.g., polyethylene, polypropylene, fiberglass, etc.) encased within a pliable cover 48. The semi-rigidity panel 44 makes it more impactable and durable than other conventional frameworks that are substantially rigid and readily damaged by vehicular impact. Panel 44 may be designed so that it could be impacted by a vehicle and compressed all the way to the loading dock wall without damage—a function not found in a conventional rigid frame.

A touch-and-hold fastener 50 (e.g., a fabric hook-and-loop fastener such as VELCRO™) can be used to contain sheet 46 within cover 48. A resiliently flexible horizontal elongate polymeric stay 52 (e.g., rod, bar, tube, etc. made of polyethylene, polypropylene, fiberglass, etc.) can be attached to panel 44 to provide support panel 44 with additional stiffness. Stay 52 can be held within a sleeve illustratively depicted as a loop of material 54 so that stay 52 can be readily replaced if necessary. A tube 56 or bar anchored to wall 18 via a series of fasteners 58 can be used for attaching an upper flange of support panel 44 to wall 18.

To provide head curtain assembly 20 with various components that can be readily replaced individually, touch-and-hold fasteners can be used throughout the assembly. A touch-and-hold fastener 60, for example, can attach an upper end of the creased foam panel's cover 38 to upper sheet 42, and another touch-and-hold fastener 62 can connect the lower end of cover 38 to a lip 64 extending from curtain 22, thereby removably attaching foam panel 34 to curtain 22. An additional touch-and-hold fastener 66 can removably attach cover 38 to support panel 44. Other touch-and-hold fasteners 68 and/or 70 can fasten upper sheet 42 to support panel 44 and/or to a flap 72 anchored to wall 18. Flexible boots 32 that help protect the upper ends of side pads 26 can also be removably attached using a touch-and-hold fastener 74 so that boots 32 are readily replaceable.

A resiliently flexible horizontal polymeric stay 76 (e.g., rod, bar, tube, etc. made of polyethylene, polypropylene, fiberglass, etc.) can be attached to the lower end of curtain 22 to provide curtain 22 with additional horizontal stiffness. Stay 76 can be held within a loop of material 78 so that stay 76 can be readily replaced if necessary. Stay 76 with or without additional weight can also help hold curtain 22 taut (e.g., vertically taut) so that curtain 22 can lie relatively flat when fully extended, as shown in FIG. 5.

To raise curtain 22 from its position of FIG. 5 to that of FIG. 6, a pull cord 80 (i.e., any pliable elongate member, such as a rope, strap, chain, etc.) attached to a lower end of curtain 22 can be threaded through a series of pulleys or eyelets 82 with one end 84 of cord 80 available for an operator (e.g., a manual operator or a mechanical operator)) to pull cord 80 so as to raise curtain 22. If cord 80 is manually pulled, curtain 22 can be held at a raised position by temporarily securing cord 80 to a cleat 86 anchored to wall 18, as shown in FIG. 6.

Figure 7:
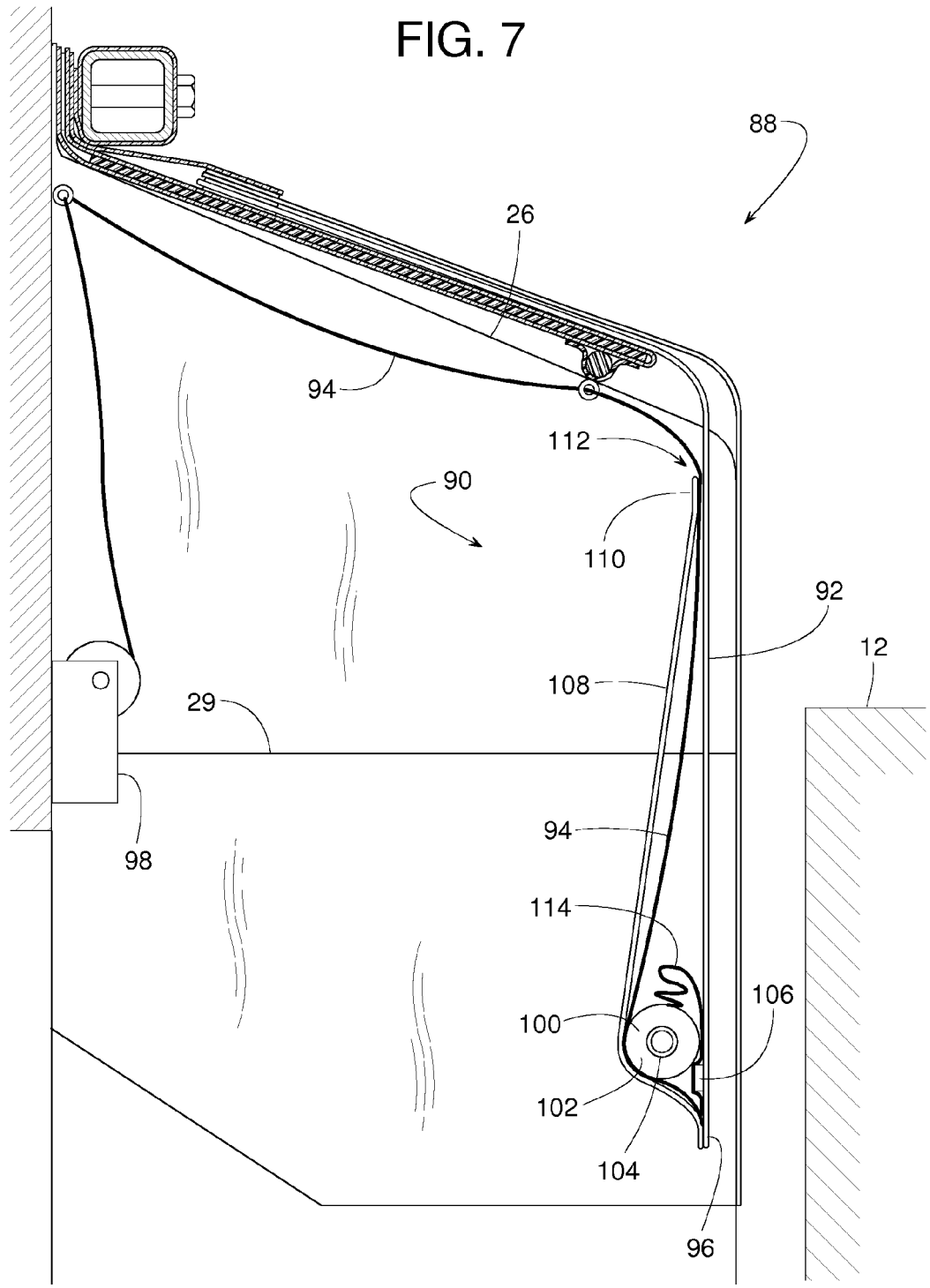
FIG. 7 is a cross-sectional view similar to FIG. 5 but showing another example dock apparatus described herein.
Figure 8:
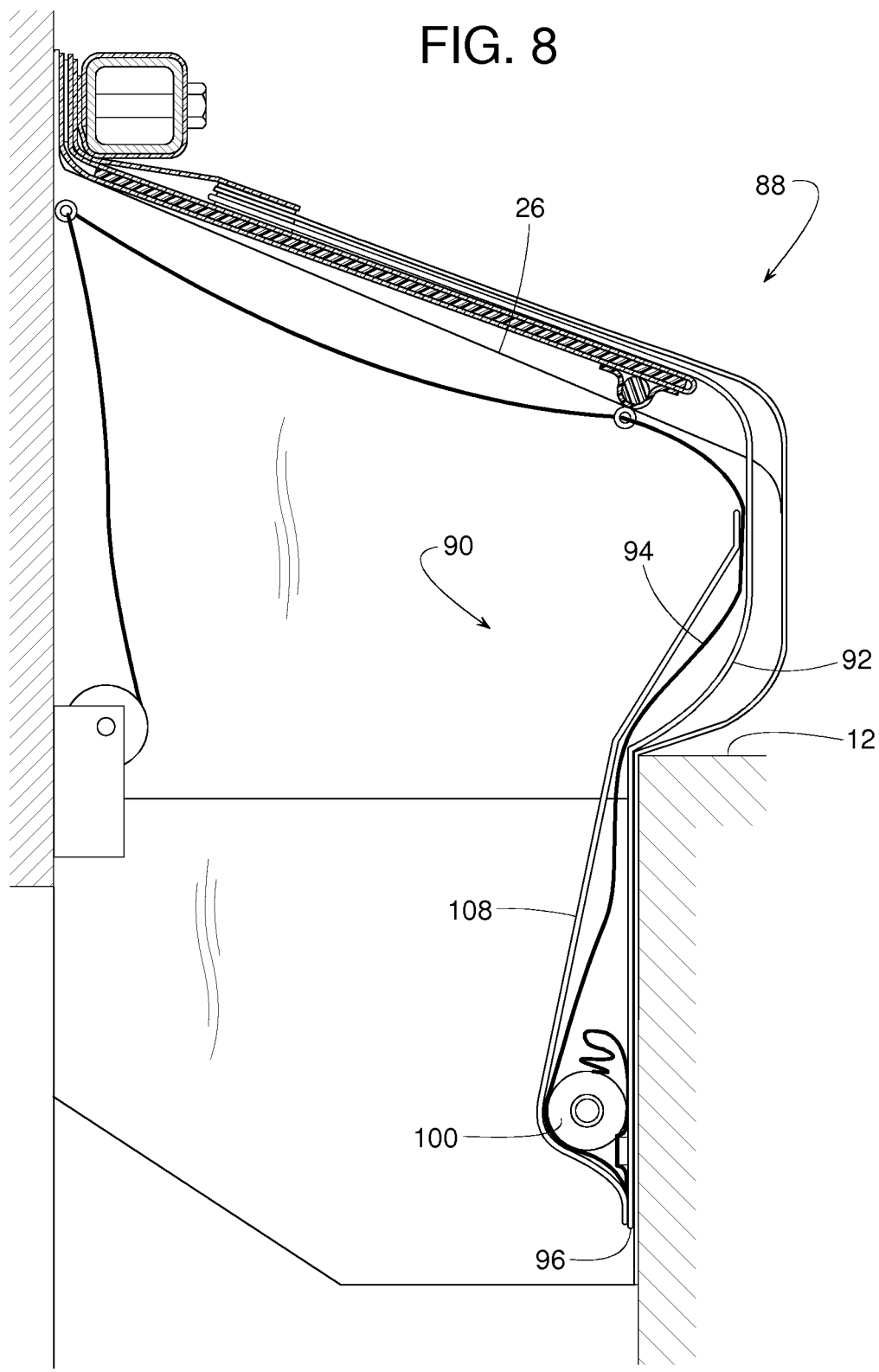
FIG. 8 is a cross-sectional view of the example dock apparatus of FIG. 7 with a vehicle engaging the example dock apparatus.
Figure 9:
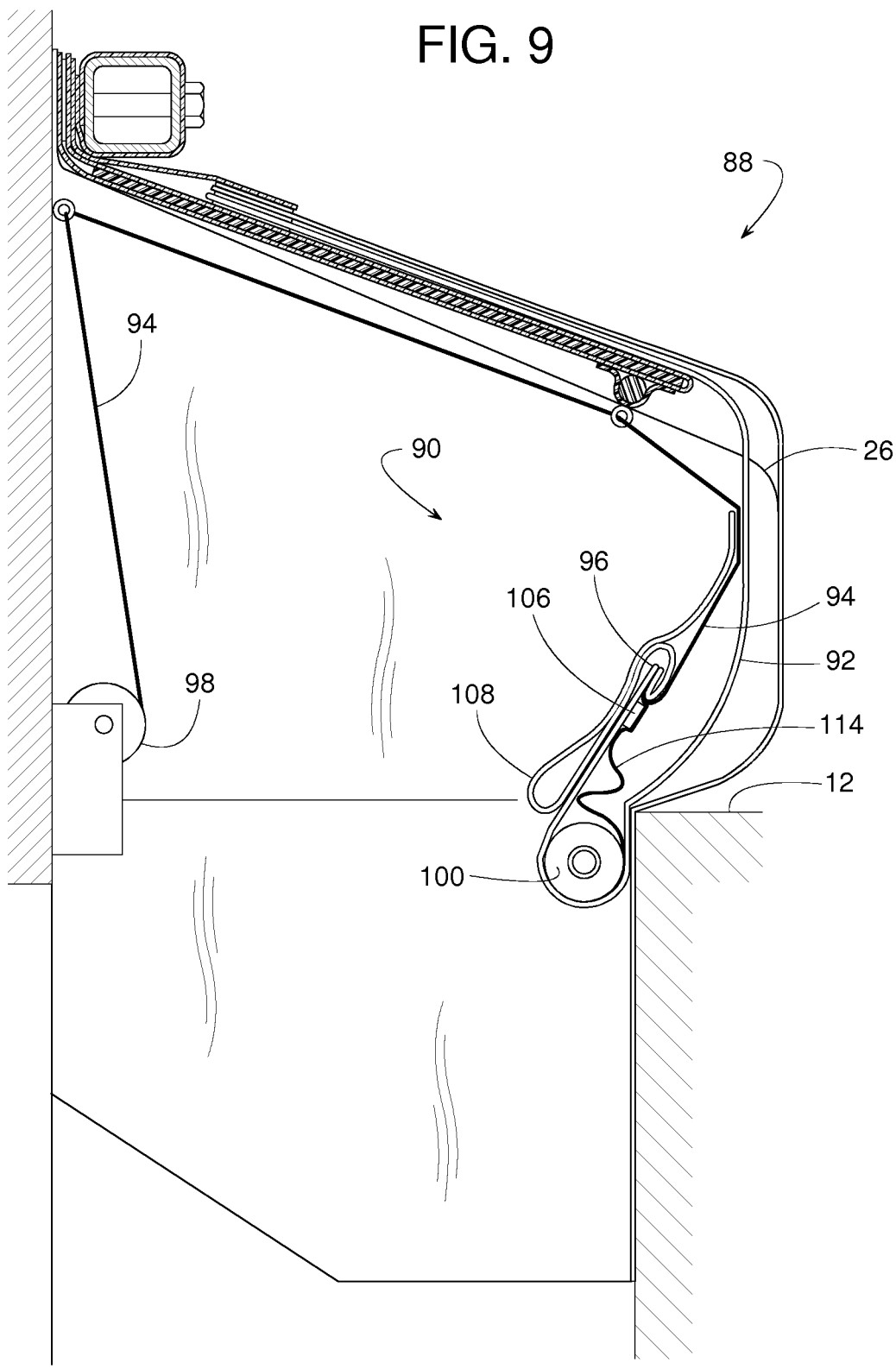
FIG. 9 is a cross-sectional view similar to FIG. 8 but showing a head curtain assembly of the example dock apparatus of FIGS. 7 and 8 in a retracted position.

In another example, FIGS. 7, 8 and 9 illustrate another example dock apparatus 88 having a head curtain assembly 90. In this example, dock apparatus 88 comprises a front curtain 92 suspended between two lateral weather barriers 26. To accommodate vehicles of various heights, a pliable elongate member 94 (e.g., a pull cord, rope, strap, chain, etc.) is coupled to a distal end 96 of front curtain 92 to selectively position distal end 96 between a lowered position (FIG. 7) and a raised position (FIG. 9). To adjust the height of curtain 92, elongate member 94 can be actuated by a motorized hoist 98 or manually pulled and released.

To ensure that front curtain 92 seals firmly against the rear of vehicle 12, a stiffener 100 is installed behind front curtain 92. Stiffener 100 is less flexible than front curtain 92 and is a horizontally elongate member that extends between the two lateral weather barriers 26 such that stiffener 100 becomes compressed horizontally between the two lateral weather barriers 26 as the lateral weather barriers are compressed by vehicle 12. Although the actual structure of stiffener 100 may vary, in some cases, stiffener 100 comprises a resilient foam cylinder 102 reinforced by a plastic tube 104. For additional stiffness, a resiliently flexible rod 106 can be attached to distal end 96 of front curtain 92.

In some examples, curtain assembly 90 includes a rear curtain 108 that helps contain and protect stiffener 100 and a lower section of elongate member 94. The lower end of rear curtain 108 connects to distal end 96 of front curtain 92. An upper end 110 of rear curtain 108 connects to the back side of front curtain 92 with one or more openings 112 for feeding elongate member 94 from the interior space between curtains 92 and 108 and externally mounted hoist 98 or cleat 86 (FIG. 5).

To help prevent stiffener 100 from escaping between curtains 92 and 108, a pliable retention member 114 may be used to attach stiffener 100 to an upper or lower end of curtain 92 and/or curtain 108. In some cases, retention member 114 is a sheet of pliable material that extends about the full length of stiffener 100.

Operation of dock apparatus 88 could begin with apparatus 88 in the lowered position, as shown in FIG. 7. Vehicle 12 backs into the dock and compresses the two lateral weather barriers 26, as shown in FIG. 8. In this position, lateral weather barriers 26 bulge inward toward each other (similar to FIG. 4), thereby holding stiffener 100 firmly up against the rear of vehicle 12. To prevent front curtain 92 from obstructing the rear access opening of vehicle 12, pliable elongate member 94 can be shorted to pull distal end 96 upward to the raised position of FIG. 9. As pliable elongate member 94 lifts distal end 96, front curtain 92 cradles and lifts stiffener 100, and rear curtain 108 folds over onto itself.

Once in the configuration of FIG. 9, bulging sections of lateral weather barriers 26 pressing stiffener 100 up against vehicle 12 holds curtain assembly 90 in the raised position, perhaps even if elongate member 100 is released (e.g., disengaged from a cleat or released by winch 98). However, when vehicle 12 departs while elongate member 94 is slack, curtain assembly 90 can freely and automatically fall back to the lowered position of FIG. 7.

If hoist 98 is used for raising curtain assembly 90 (as opposed to the manual option of FIGS. 5 and 6), the electrical current drawn by the hoist 98 can be sensed and used as a means for automatically stopping the lift of curtain 92. Lifting stiffener 100 from the lowered position of FIG. 8 to the raised position of FIG. 9 generally requires less current than it takes to lift stiffener 100 up and over the upper rear edge of vehicle 12, i.e., above and beyond the stiffener's position of FIG. 9. Such increase in current drawn by the hoist 98 could be used as a signal for stopping hoist 98 when stiffener 100 reaches its properly raised position. The operation of hoist 98 could also be controlled in concert with other dock-related equipment including, but not limited to, vehicle restraints, dock levelers, doors, vehicle sensors, etc.

To enhance a lateral weather barrier's ability to firmly hold a head curtain (e.g., including, but not limited to curtain or curtain assemblies 20, 90 or 120) up against the rear of vehicle 12, a lateral weather barrier can be provided with a flexible inner surface that is shaped such that the surface bulges in a particularly advantageous manner. Examples of such surfaces are illustrated in FIGS. 10-15. The surfaces in these examples are part of a boot, wherein the boot is considered as being part of a lateral weather barrier (i.e., the lateral weather barrier includes the boot). Such functionality was not possible in previous systems that did not have adequate lateral stiffness to be held in place by the inwardly-bulging lateral weather barriers 26.

Figure 10:
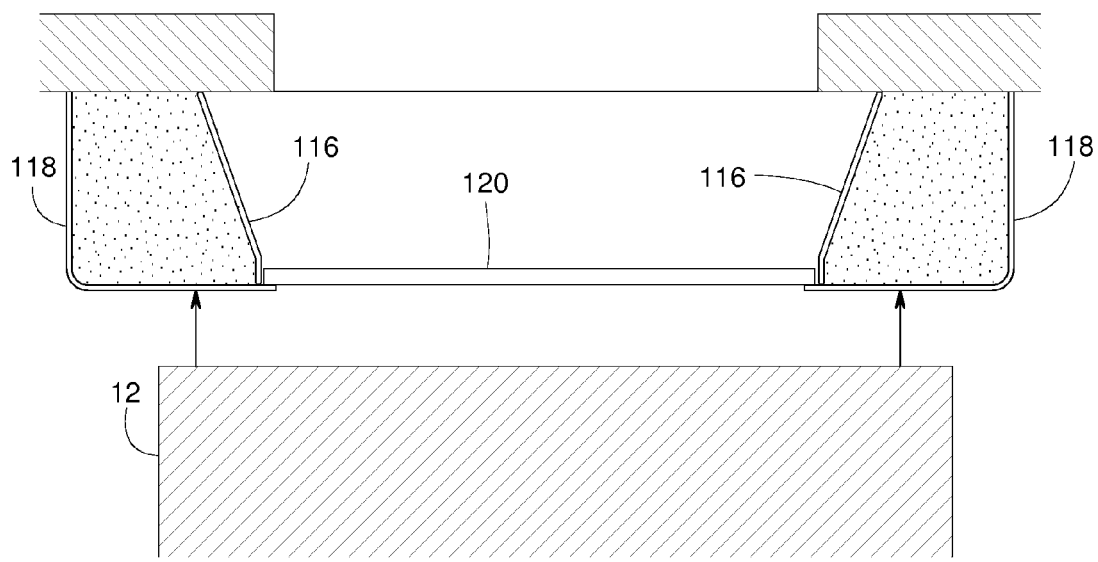
FIG. 10 is a cross-section view similar to FIG. 3 but showing another example dock apparatus described herein.
Figure 11:
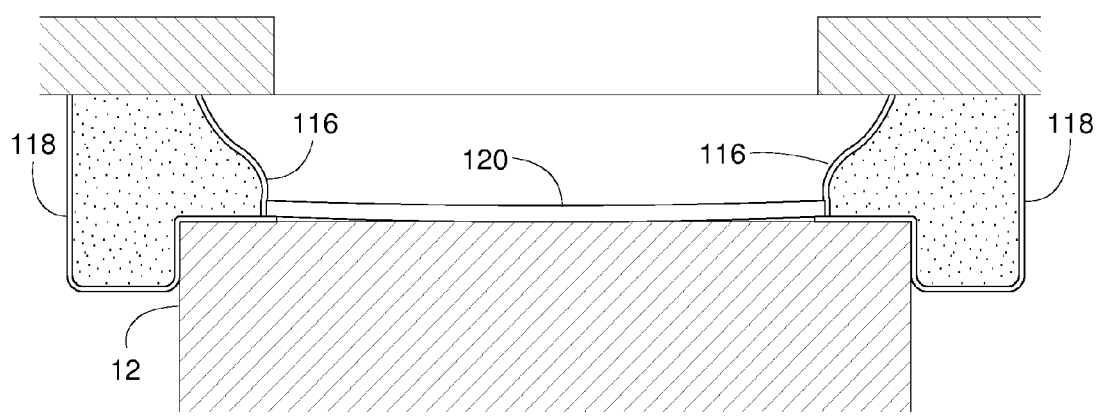
FIG. 11 is a cross-section view similar to FIG. 10 but showing a vehicle engaging the example dock apparatus of FIG. 10.

In FIGS. 10 and 11, two inner surfaces 116 of the boots of lateral weather barriers 118 allow some lateral clearance or light interference with curtain 120 when vehicle 12 is spaced apart from weather barriers 118, as shown in FIG. 10. Under compression by vehicle 12, however, surfaces 116 bulge toward each other to hold curtain 120 firmly against vehicle 12, as shown in FIG. 11. Surfaces 116 can be provided by a resiliently flexible panel similar to panel 29 of FIG. 2.

Figure 12:
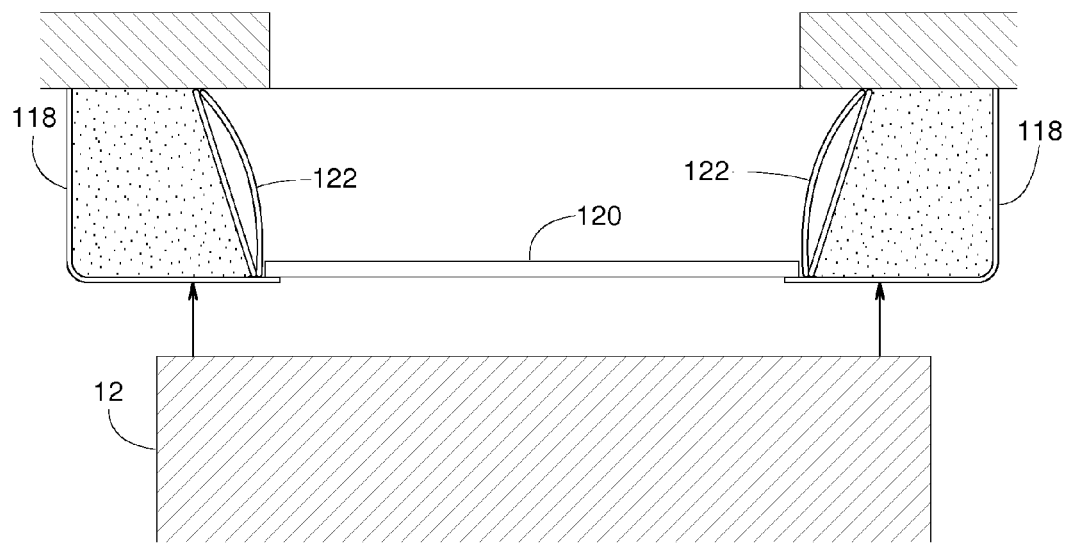
FIG. 12 is a cross-sectional view similar to FIG. 10 but showing another example dock apparatus described herein.
Figure 13:
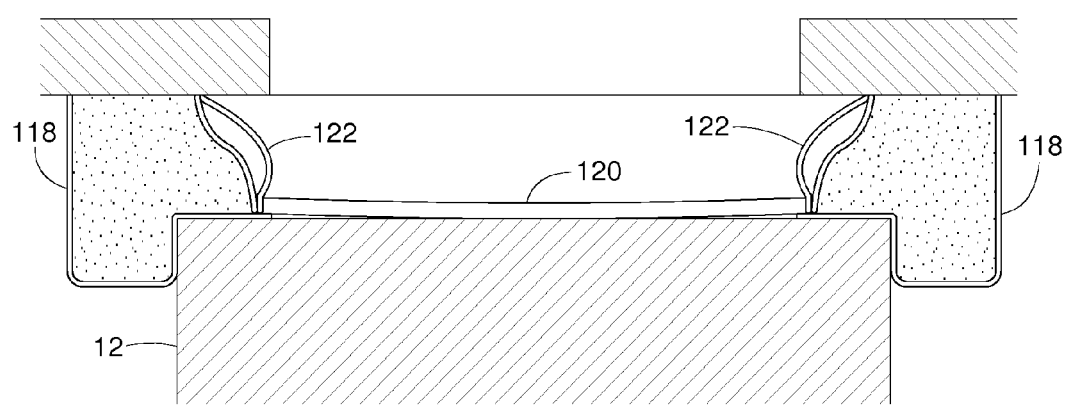
FIG. 13 is a cross-sectional view of the example of FIG. 12 but showing a vehicle engaging the example dock apparatus of FIG. 12.

In FIGS. 12 and 13, two inner surfaces 122 of the boots of lateral weather barriers 118 allow some lateral clearance or light interference with curtain 120 when vehicle 12 is spaced apart from weather barriers 118, as shown in FIG. 12. Under compression by vehicle 12, however, surfaces 122 bulge toward each other to hold curtain 120 firmly against vehicle 12, as shown in FIG. 13. Surfaces 122, in some examples, are provided by a resiliently flexible panel sewn or otherwise attached to a panel similar to panel 29 of FIG. 2. Such resiliently flexible panels enhance the pinching action of surfaces 122 against the lateral edges of curtain 120.

Figure 14:
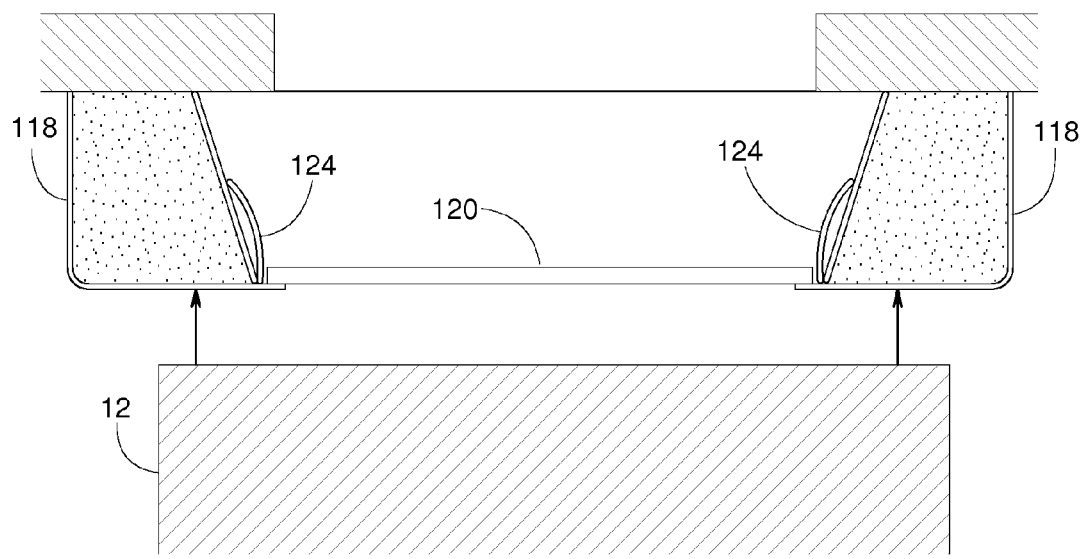
FIG. 14 is a cross-sectional view similar to FIG. 10 but showing yet another example dock apparatus described herein.
Figure 15:
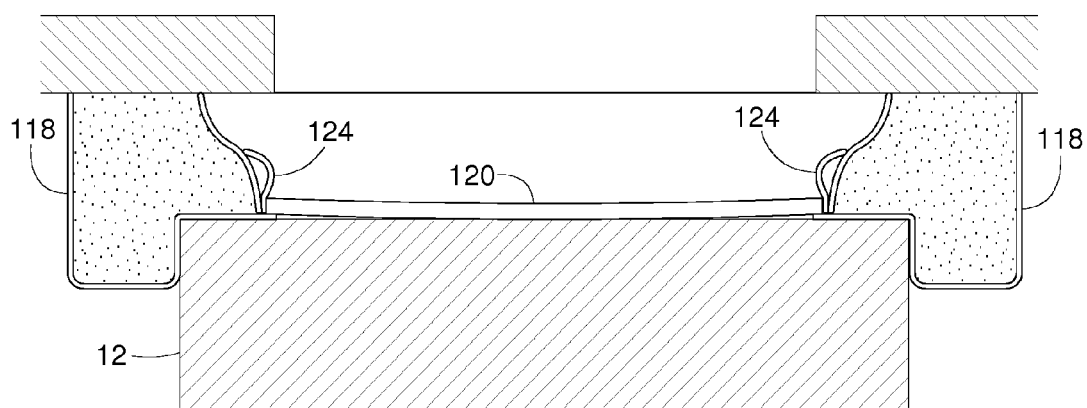
FIG. 15 is a cross-sectional view of the example of FIG. 14 but showing a vehicle engaging the example dock apparatus of FIG. 14.

In FIGS. 14 and 15, two inner surfaces 124 of the boots of lateral weather barriers 118 allow some lateral clearance or light interference with curtain 120 when vehicle 12 is spaced apart from weather barriers 118, as shown in FIG. 14. Under compression by vehicle 12, however, surfaces 124 bulge toward each other to hold curtain 120 firmly against vehicle 12, as shown in FIG. 15. Surfaces 124 can be provided by a resiliently flexible panel sewn or otherwise attached to a panel similar to panel 29 of FIG. 2.

It should be noted that existing dock seals with a compressible foam head pad can be retrofitted with the head curtain assemblies disclosed herein. In replacing an existing head pad, however, it may be beneficial to add a short vertical extension onto the existing side pads so that the new head curtain assembly is at sufficient height properly service vehicles of varying heights. Such an extension could be made similar to lateral weather barrier 26, only significantly shorter. The extension can include cavity 31 to reduce compressive forces at the boot.

Figure 16:
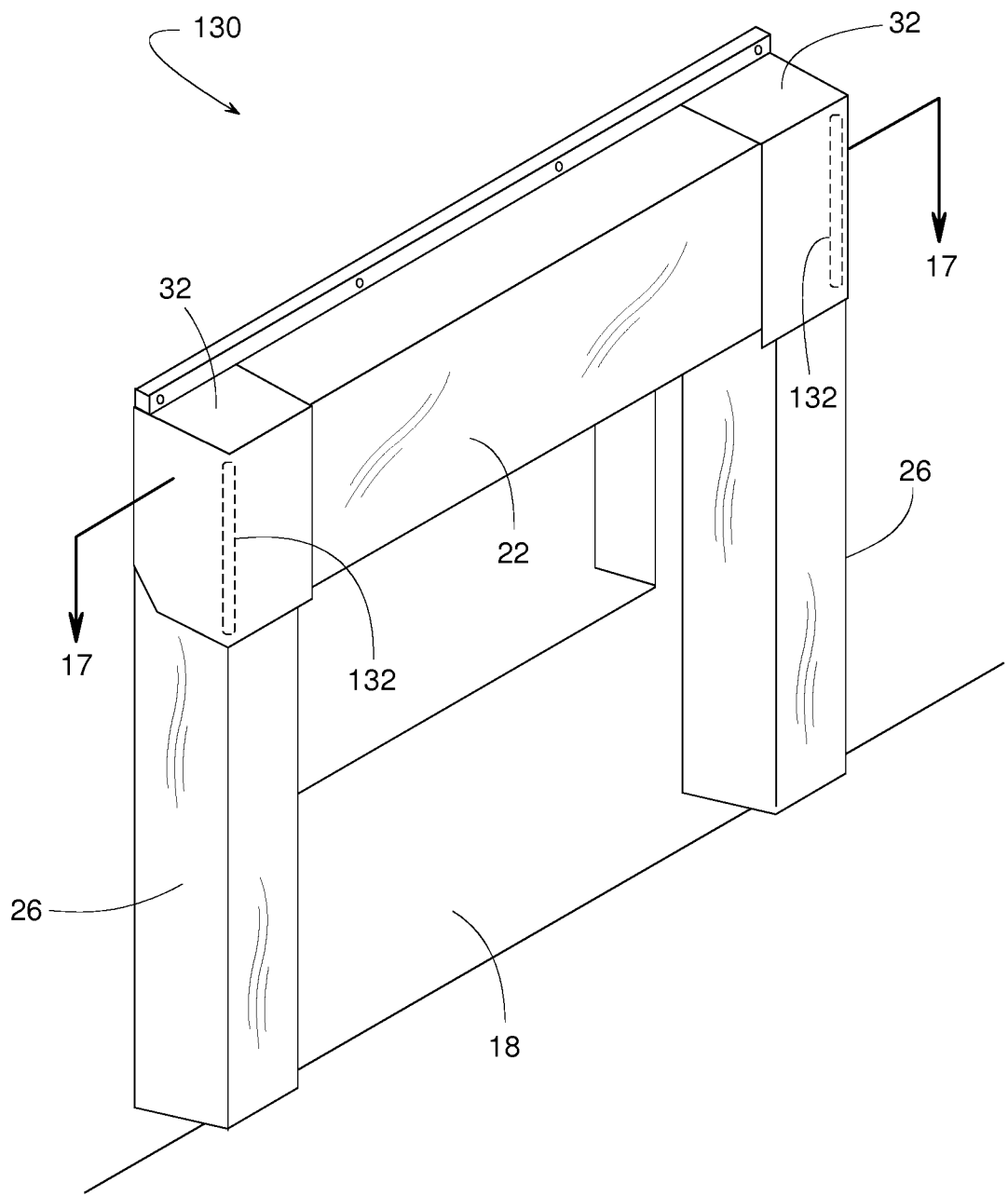
FIG. 16 is a perspective view of another example dock apparatus described herein.
Figure 17:
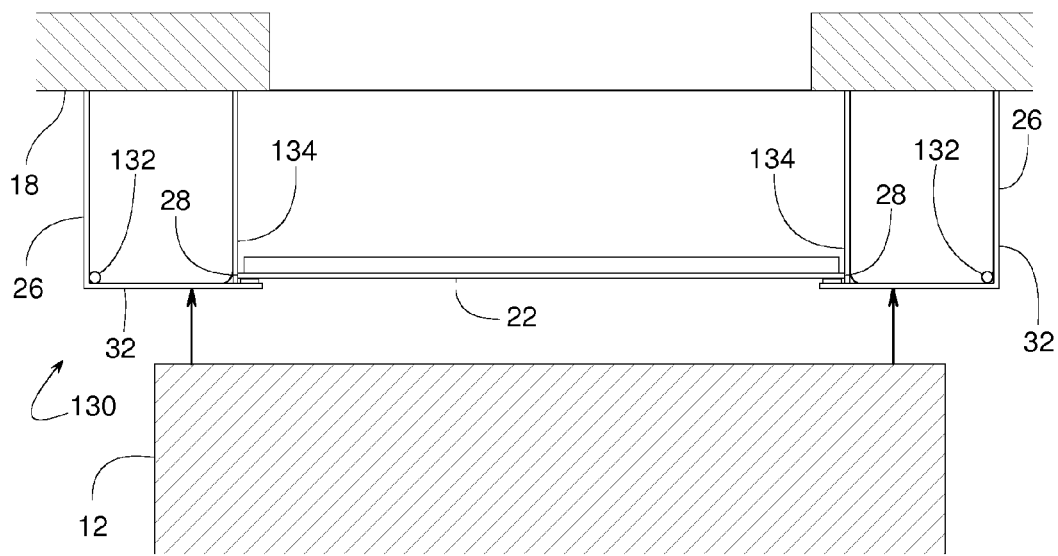
FIG. 17 is a cross-sectional view of the example dock apparatus of FIG. 16 taken along line 17-17 of FIG. 16.
Figure 18:
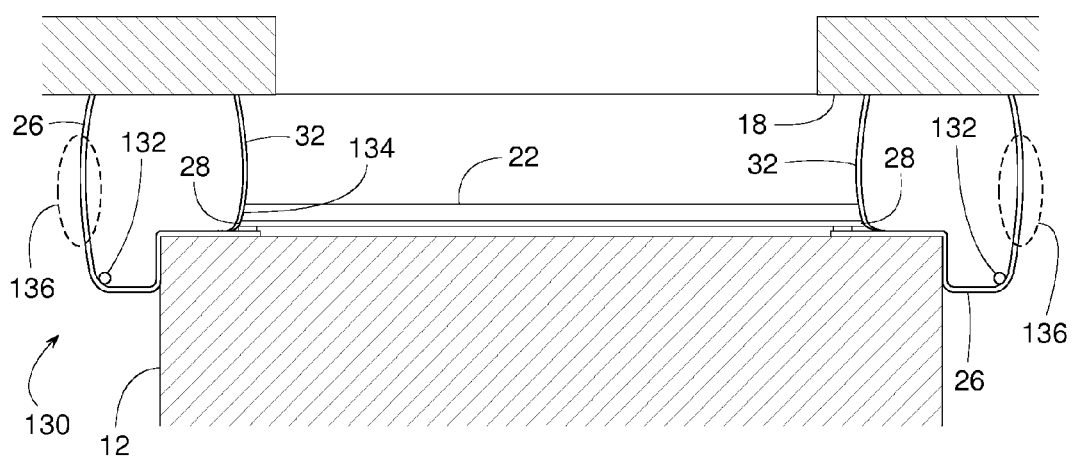
FIG. 18 is a cross-sectional view similar to FIG. 17 but showing the example dock apparatus compressed by a vehicle.

In the example of FIGS. 16-18, a loading dock apparatus 130 includes a stiffener 132 at each upper corner to help ensure that upon vehicle 12 compressing two lateral weather barriers 26, the barriers 26 bulge inward toward each other to seal against the lateral edges 28 of front head curtain 22. In this example, each of the lateral weather barriers 26 are shown as resiliently compressible side pads, wherein each pad comprises a foam core contained within a pliable cover. FIG. 17 shows dock apparatus 130 prior to being compressed by vehicle 12, and FIG. 18 shows apparatus 130 in compression or being engaged by the vehicle 12.

In some examples, the length of dimension of stiffener 132 (e.g., vertically elongate) is shorter than the lengths of pads 26, and is made of a stiffer material (e.g., fiberglass) than that of pad 26 and/or boot 32. In the illustrated example, each stiffener 132 is disposed in the vicinity of upper sealing member (e.g., front curtain 22) and positioned to place the two pads 26 between the two stiffeners 132. In this position, stiffeners 132 resists the pad's tendency to bulge away from each other, thus the pads 26 are more inclined to bulge inward to press its inner surfaces 134 sealingly tight against the curtain's lateral edges 28. Although stiffeners 132 enhance or increase the amount of side pad's inward bulging, a small portion of pad 26 might still bulge into an area 136 that is between wall 18 and stiffeners 132.

Figure 19:
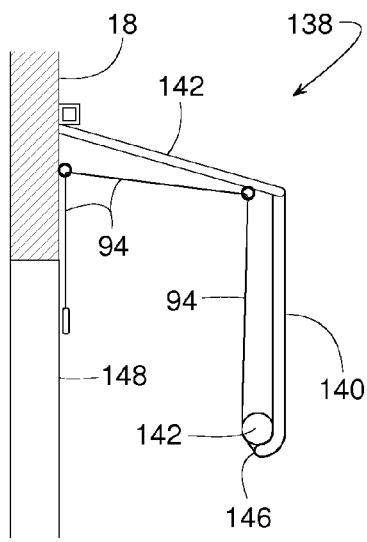
FIG. 19 is a cross-sectional view similar to FIG. 5 but showing another example dock apparatus described herein.
Figure 20:
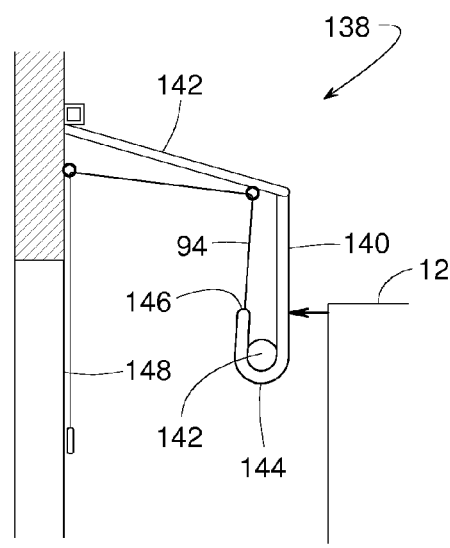
FIG. 20 is a cross-sectional view similar to FIG. 19 but showing a curtain of the example dock apparatus of FIG. 19 in a retracted position.

In the example of FIGS. 19 and 20, a dock apparatus 138 comprises a retractable front curtain 140 suspended from an overhead support panel 142. Curtain 140 is schematically illustrated to represent any retractable single sheet of material, multi-sheet of material, foam panel, pliable cover, and/or various combinations thereof. Curtain 140, for example, may include one or more of the construction details of the curtain shown in FIG. 5 or 7. Curtain 140, however, does not utilize retention member 114 (FIG. 7) fastened to a roller 142 (e.g., stiffener 100 of FIG. 7). Instead, roller 142 is cradled in a sling 144 provided by curtain 140 with the support of pliable elongate member 94.

To retract curtain 140, elongate member 94 pulls a lower edge 146 of curtain 144 from a lowered position (FIG. 19) to a raised position (FIG. 20). As lower edge 146 moves from its lowered position to its raised position, lower edge 146 rises between roller 142 and an imaginary plane 148 defined by wall 18.

Figure 21:
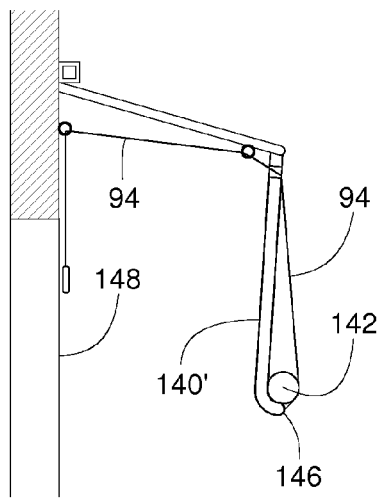
FIG. 21 is a cross-sectional view similar to FIG. 19 but showing another example dock apparatus described herein.
Figure 22:
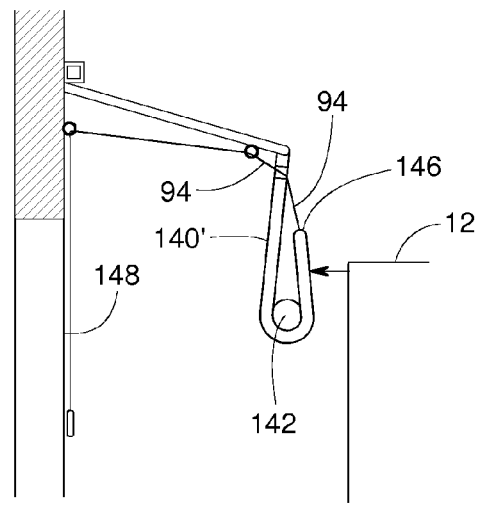
FIG. 22 is a cross-sectional view similar to FIG. 21 but showing a curtain of the example dock apparatus of FIG. 21 in a retracted position.

In another example, shown in FIGS. 21 and 22, elongate member 94 retracts a curtain 140' in a somewhat reversed manner compared to the curtain 140 of FIGS. 19 and 20. As lower edge 146 moves between a lowered position and a raised position, roller 146 at some point becomes interposed between lower edge 146 and wall plane 148. The arrangement of FIGS. 19 and 20 can make it easier to retract curtain 140 with less effort, but the arrangement of FIGS. 21 and 22 can pull curtain 140' more tightly against a rear edge of vehicle 12 for better sealing.

Figure 23:
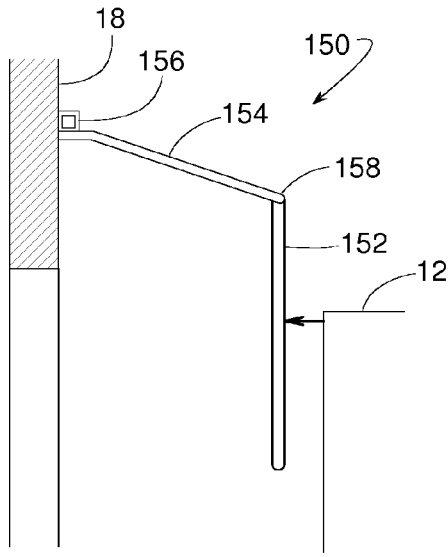
FIG. 23 is a cross-sectional view similar to FIG. 19 but showing another example dock apparatus described herein.
Figure 24:
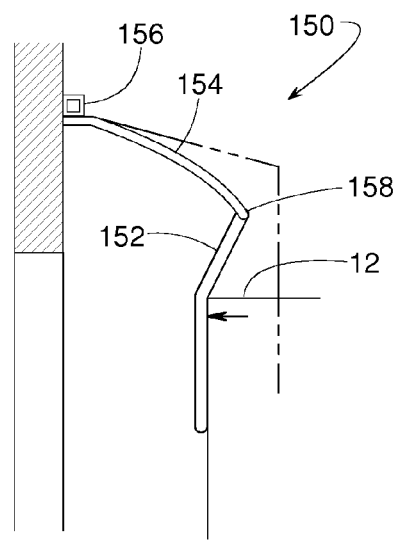
FIG. 24 is a cross-sectional view similar to FIG. 23 but showing a curtain of the example dock apparatus of FIG. 23 being engaged by a vehicle.

In another example, shown in FIGS. 23 and 24, a dock apparatus 150 comprises a front curtain 152 suspended from an overhead support panel 154. Curtain 152 is schematically illustrated to represent any retractable single sheet of material, multi-sheet of material, foam panel, pliable cover, and/or various combinations thereof. Curtain 152, for example, may include one or more of the construction details of the curtain shown in FIG. 5 or 7. In this example, support panel 154 is relatively stiff to help support the weight of curtain 152 yet is resiliently flexible to bend between a relaxed position (FIG. 23) and a strained position (FIG. 24).

In this example, an anchor bar 156 (e.g., structural angle, structural channel, tube 56, etc.) is firmly attached to wall 18 and support panel 154 to help hold panel 154 at its relaxed position and to help panel 154 resist deflecting to its strained position. As vehicle 12 backs into or otherwise engages curtain 152, the friction between curtain 152 and vehicle 12 pulls curtain 152 downward, which pulls a distal edge 158 of support panel 154 downward toward (e.g., closer) to wall 18. As this occurs, the deflection resistance of support panel 154 urges curtain 152 sealingly tight up against a rear edge of vehicle 12.

In some examples, to further support panel 154 at its relaxed position of FIG. 23, dock apparatus 150 can be used in conjunction with a resiliently flexible horizontally elongate stay (e.g., stay 52 of FIG. 5) resting atop two lateral weather barriers (e.g., side pad 26 of FIG. 5).

Figure 25:
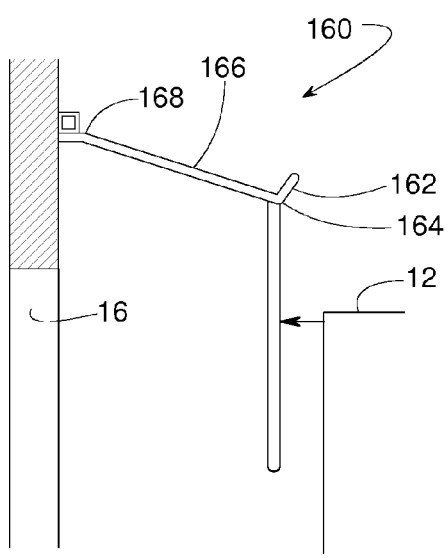
FIG. 25 is a cross-sectional view similar to FIG. 19 but illustrating another example dock apparatus described herein having an example gutter lip.
Figure 26:
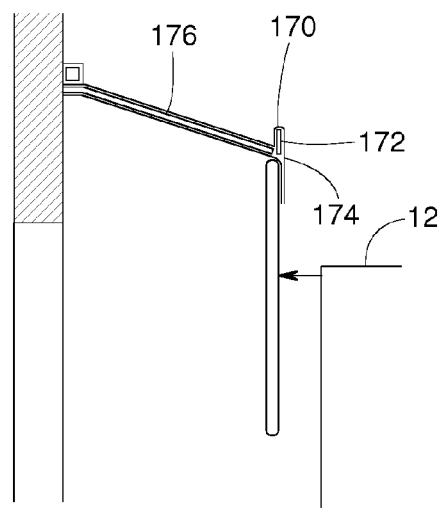
FIG. 26 is a cross-sectional view similar to FIG. 25 but showing another example gutter lip described herein.

In some examples, as shown in FIG. 25, a dock apparatus 160 includes a gutter lip 162 extending along and protruding upward from a distal edge 164 of a support panel 166. Lip 162 helps deflect water that might drain down across the upper surface of panel 166, from a proximal edge 168 of panel 166 to distal edge 164, thus inhibiting the drainage from dripping between the rear of vehicle 12 and doorway 16. In some examples, as shown in FIG. 25, lip 162 is an integral extension of panel 166, whereby lip 162 and panel 166 comprise a unitary piece. In other examples, as shown in FIG. 26, a gutter lip 170 is in the form of a resiliently flexible piece 172 contained within a pliable cover 174. Pliable cover 174, in some examples, also covers a support panel 176.

Figure 27:
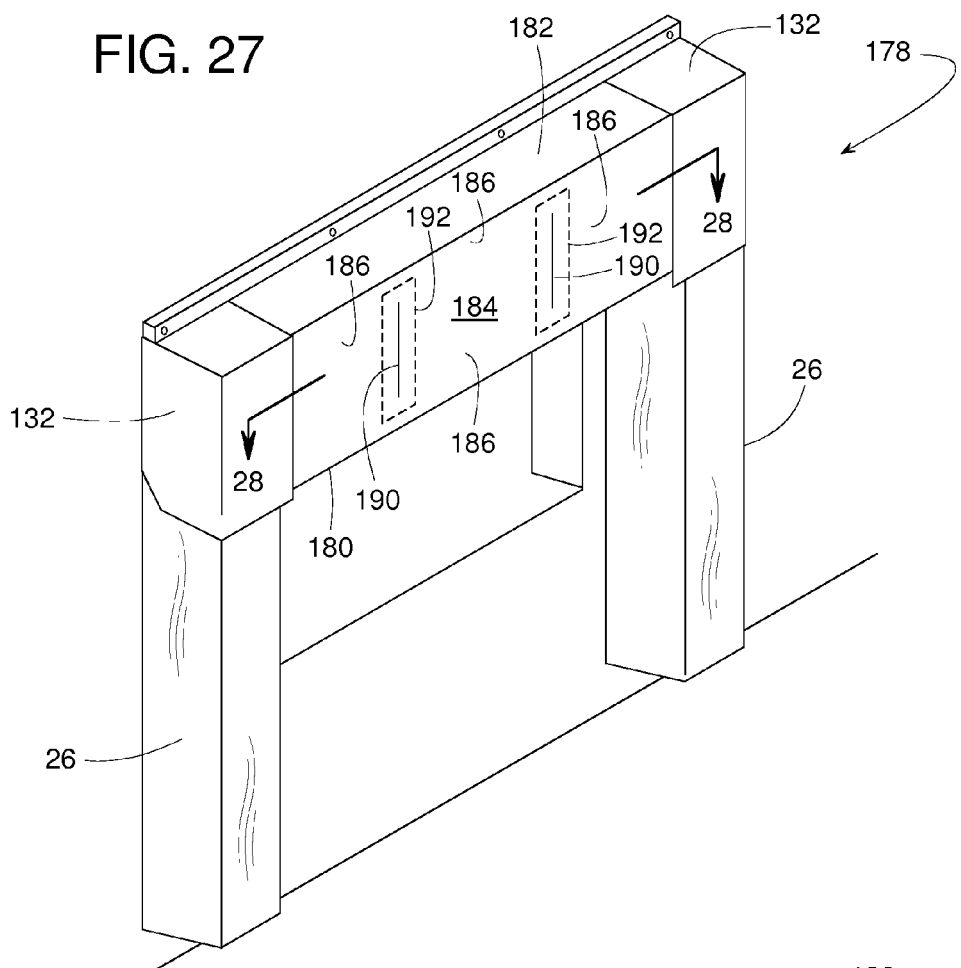
FIG. 27 is a perspective view of another example dock apparatus described herein.
Figure 28:
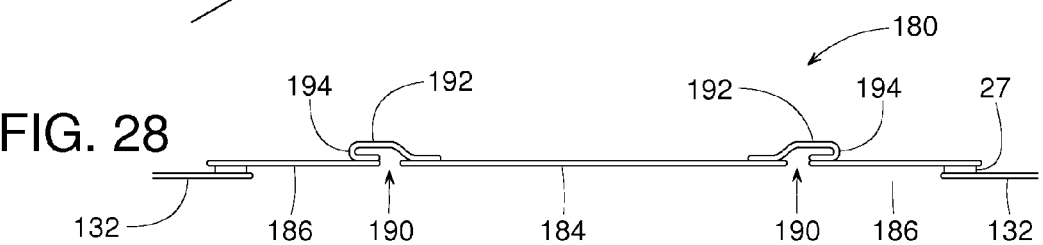
FIG. 28 is a cross-sectional view of the example dock apparatus of FIG. 27 taken along line 28-28 of FIG. 27.
Figure 29:
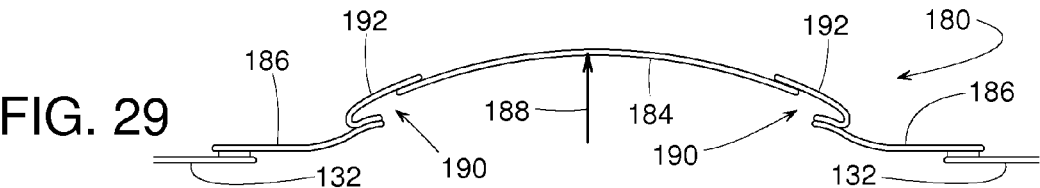
FIG. 29 is a cross-sectional view similar to FIG. 28 but showing a curtain of the example dock apparatus of FIGS. 27 and 28 being deflected by a force.

In some cases, the upper rear edge of a vehicle includes a rearward protrusion, such as hardware associated with a rear door latch. To help prevent such a protrusion from poking through a front curtain or front pad of a dock seal or shelter, an example dock apparatus 178, shown in FIGS. 27-29, includes a retractable front curtain 180 suspended from a support panel 182. Curtain 180 includes an inner region 184 that has a greater penetrating force tolerance than that of an outer peripheral region 186 of the curtain 180. A region having "greater penetrating force tolerance" means that for a given protrusion pressing with a given force (once or repeatedly) against the region, the region will experience less permanent damage than another region subject to the same pressing force. FIG. 28 shows curtain 180 without being subjected to a penetrating force, and FIG. 29 shows curtain 180 reacting to a penetrating force 188 from a vehicle.

To achieve greater penetrating force tolerance, in some examples, front curtain 180 includes two slits 190 that flank inner region 184. Slits 190 provide inner region 184 with greater flexibility or more freedom to flex in reaction to penetrating force 188, as slits 190 make inner region 184 less constrained by outer region 186. To prevent air and water from leaking through slits 190, an expansion joint 192 covers each slit 190. In some examples, expansion joint 192 is a web of flexible material with one edge 194 folded back onto itself with the entire perimeter of the web being sewn or otherwise attached to the back side of curtain 180.

In some examples, as shown in FIGS. 30-32, a series or plurality of overlapping pleats 196 cover inner region 184 of curtain 180 to provide several benefits. Pleats 196 provide curtain 180 with even greater penetrating force tolerance, greater wear resistance, and/or improved sealing against an upper surface 198 of vehicle 12. As vehicle 12 backs into curtain 180, pleats 196 deflect as shown in FIG. 32 to press sealingly tight downward against the vehicle's upper surface 198. In other examples, pleats 196 can be added to other example curtains and/or header pads (e.g., the curtains 32, 92, 12, 140, 140', and 152 described herein), even the curtains or head pads without additional features (e.g., slits) that make the curtains and/or header pads more tolerant of penetrating forces.

In some examples, as shown in FIGS. 33-35, a dock apparatus 200 includes a curtain 202 with a series of flexible loops 204 instead of pleats 196. Loops 204, in some examples, are made of a flexible material similar to the material of curtain 202 and can be sewn or otherwise attached to the front face of curtain 202 or attached to the front face of a foam header pad via any other suitable fastener such as, for example, Velcro®, adhesive, etc. Loops 204 provide the front face of curtain 202 with more compliance to seal against vehicle 12. Such compliance can also make curtain 202 more tolerant of rearward protrusions on vehicle 12.

In some examples, shown in FIGS. 36-38, a dock apparatus 206 includes a retractable curtain 208 with a series of pleats 210 overlapping a series of loops 212. In this example, loops 212 are more triangular than U-shaped or bell-shaped, and loops 212 bias pleats 210 in a generally outward projection. As vehicle 12 backs into curtain 208, loops 212 urge pleats 210 down into and against vehicle 12. Loops 212 in combination with pleats 210 not only provide the front face of curtain 208 with more compliance to seal against vehicle 12 but also provides curtain 208 with more tolerance of rearward protrusions on vehicle 12.

Figure 39:
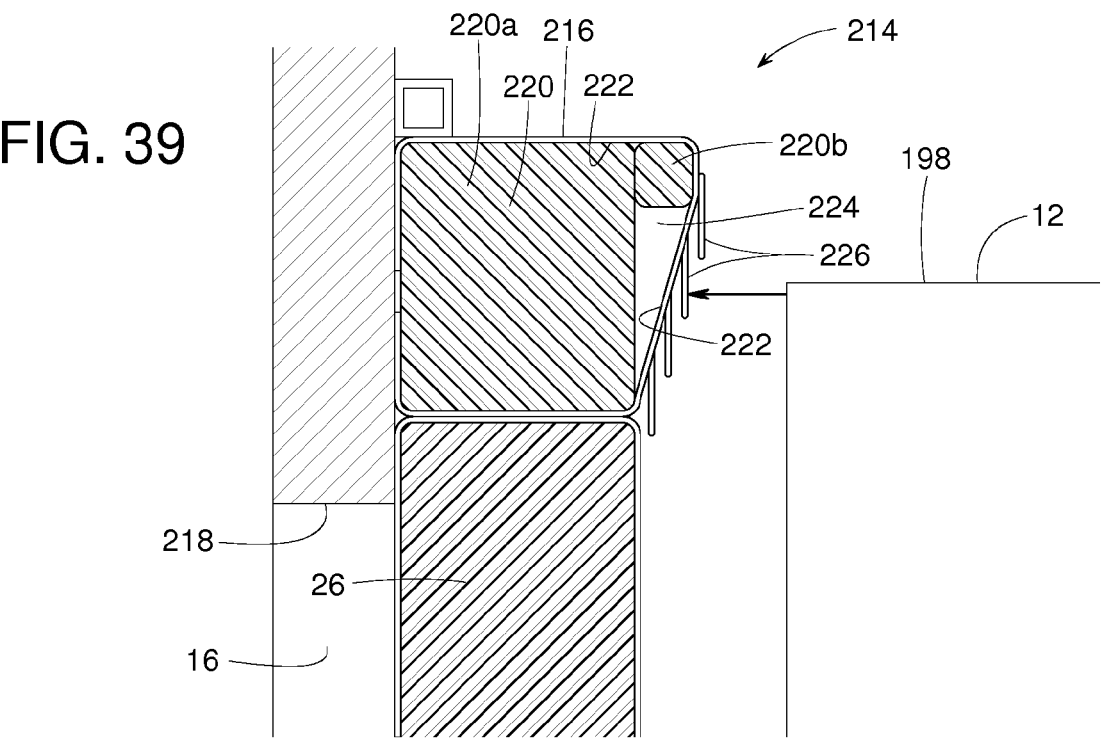
FIG. 39 is a cross-sectional view similar to FIG. 5 but showing another example dock apparatus described herein.
Figure 40:
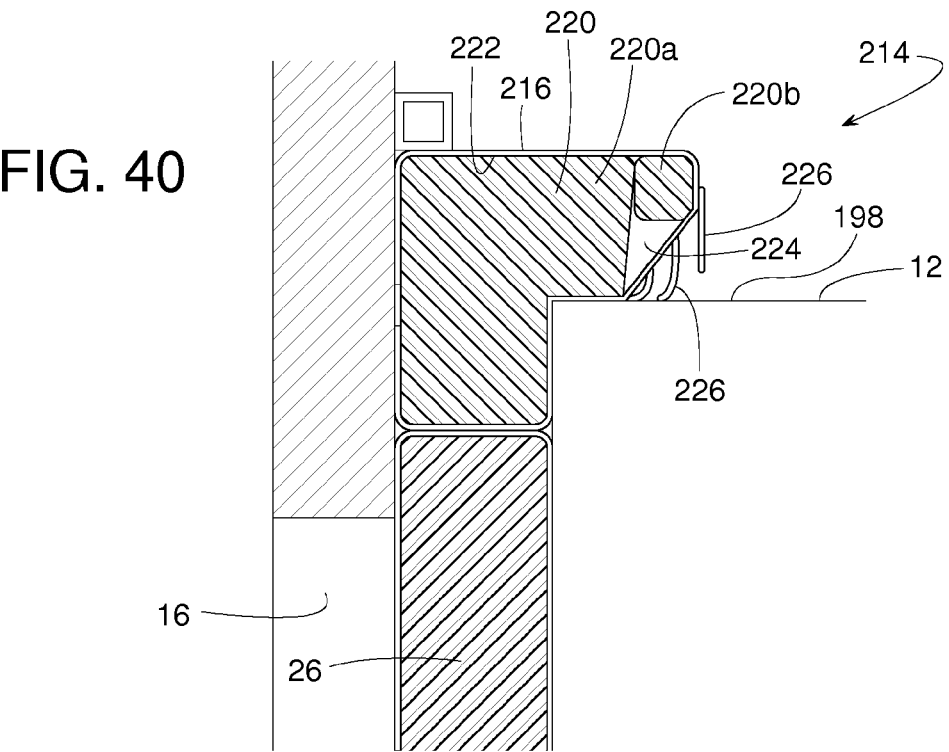
FIG. 40 is a cross-sectional view similar to FIG. 39 but showing the example dock apparatus of FIG. 39 being engaged by a vehicle.

In some examples, shown in FIGS. 39 and 40, a dock apparatus 214 comprises a resiliently compressible header 216 that is substantially horizontally elongate and mounted in proximity with an overhead edge 218 of doorway 16. In this example, header 216 comprises a resiliently compressible foam core 220 contained within a pliable cover 222. A cavity 224 (e.g., a collapsible cavity) defined by foam core 220 renders header 216 more tolerant of rearward protrusions on vehicle 12. In some examples, core 220 is a single piece of foam defining cavity 224, and in other examples, the header's foam core is comprised of multiple foam pieces. In the illustrated example, the header's foam core 220 is comprised of two foam pieces 220a and 220b.

To provide header 216 with greater penetrating force tolerance, greater wear resistance, and improved sealing against upper surface 198 of vehicle 12, header 216 includes a plurality of pleats 226 overlying cover 222 such that cavity 224 is between foam core 220 and pleats 226. As vehicle 12 backs into header 216, pleats 226 deflect as shown in FIG. 40 to press sealingly tight downward against the vehicle's upper surface 198. To seal along the rear vertical edges of vehicle 12, some examples of dock apparatus 214 also include a pair of resiliently compressible weather barriers 26 that are installed along the lateral vertical edges of doorway 16.

While plurality of pleats 226 may be particularly effective at sealing against vehicle 12 when pleats 226 are used in conjunction with cavity 224, plurality of pleats 226 may also provide an effective seal against vehicle's upper surface 198, even without cavity 224. In a header without foam piece 220b and cavity 224, cover 222 would tightly overlay foam core 220 and a plurality of pleats 226 would overlay a front face of cover 222. As vehicle 12 backs into header 216, lower portion of foam core 220 compresses, pushing pleats 226 out and causing pleats 226 to deflect and press sealingly tight downward against the vehicle's upper surface 198. In this manner, pleats 226 effectively cover any gaps that may otherwise exist between cover 222 and vehicle 12 and divert rain water away from the header 216. Typically, pleats are often used exclusively on loading dock side pads (e.g., side pads 26 of FIG. 1) to provide increased wear resistance to the covers of the side pads (lateral edges of a vehicle rub against the side pads as the vehicle is loaded or unloaded), but the current example utilizes pleats 226 on header 216 as sealing and rain diversion devices. The pleats 226 on header 216 may span the entire length of the header (spanning substantially the entire gap between side pads 26) to provide effecting sealing and rain diversion across the entire width of vehicle 12.

At least some of the aforementioned examples include one or more features and/or benefits including, but not limited to, the following:

In some examples, a dock apparatus includes a retractable head curtain that is more flexible about a horizontal axis than a vertical axis.

In some examples, the head curtain is supported by a resiliently compressible, creased foam panel.

In some examples, the creases in the foam panel are created by sewing the foam panel to a pliable cover using a series of horizontal stitch lines.

In some examples, the foam panel is removably attached to the head curtain.

In some examples, the head curtain is removably attached to a support panel.

In some examples, the support panel is stiffened by a readily replaceable fiberglass stay.

In some examples, the lower end of the head curtain is stiffened by a readily replaceable fiberglass stay.

In some examples, the dock apparatus includes a pair of protective boots that are readily replaceable.

Although certain example methods, apparatus, and articles of manufacture have been described herein, the scope of coverage of this patent is not limited thereto. On the contrary, this patent covers all methods, apparatus, and articles of manufacture fairly falling within the scope of the appended claims either literally or under the doctrine of equivalents.

The invention claimed is:

1. A dock apparatus subject to a penetrating force exerted by an upper edge of a vehicle parked at a doorway of a wall, the dock apparatus comprising:
   a curtain to be suspended from a support panel and configured to be engaged by the vehicle, the curtain having an inner region within an outer peripheral region, the inner region positioned between inner surfaces defining an opening of the doorway, the curtain having:
      a plurality of loops attached to the curtain, the plurality of loops to project away from a vehicle-engaging surface of the curtain; and
      a plurality of pleats overlapping the plurality of loops such that the plurality of loops is positioned between the vehicle-engaging surface of the curtain and the plurality of pleats, at least one of the plurality of pleats or the plurality of loops being positioned within the inner region of the curtain, the plurality of loops to urge the plurality of pleats in a direction away from the curtain to enable the plurality of pleats to seal against at least one of a rear surface or an upper surface of the vehicle when the vehicle engages the vehicle-engaging surface of the curtain.

2. The dock apparatus of claim 1, wherein the plurality of loops urge the plurality of pleats away from the curtain when the vehicle is not engaged with the curtain.

3. The dock apparatus of claim 1, wherein the plurality of loops urge the plurality of pleats against the at least the upper surface of the vehicle when a rear surface of the vehicle engages the curtain.

4. The dock apparatus of claim 3, wherein each pleat of the plurality of pleats has a first end coupled to the curtain and a second end to move freely relative to the first end or the curtain.

5. The dock apparatus of claim 1, wherein the plurality of loops urge the plurality of pleats in an outwardly direction relative to the vehicle-engaging surface of the curtain such that the plurality of pleats is angled relative to the vehicle-engaging surface of the vehicle.

6. The dock apparatus of claim 1, wherein the plurality of loops comprises at least one of triangular shape or profile.

7. The dock apparatus of claim 1, wherein at least one of the plurality of pleats or the plurality of loops extends across at least a portion of an entire length of the curtain.

8. The dock apparatus of claim 1, wherein the support panel is horizontally elongate and extending lengthwise along a width of the doorway when a proximal edge of the support panel is mounted above the doorway in proximity with the wall while a distal edge of the support panel extends away from the wall.

9. A dock apparatus engagable by a vehicle parked at a doorway of a wall, the dock apparatus comprising:
 a seal horizontally elongate and mountable in proximity to an overhead edge of the doorway, the seal having a first pliable cover that includes:
  a vehicle-engaging surface to be engaged by the vehicle;
  a plurality of loops coupled to the vehicle-engaging surface; and
  a plurality of pleats overlapping the plurality of loops such that the plurality of loops are positioned between a vehicle-engaging surface of the seal and the plurality of pleats, at least one of the plurality of pleats or the plurality of loops extends across only a portion of a length of the seal, the plurality of loops to urge the plurality of pleats in a direction away from the vehicle-engaging surface of the seal to enable the plurality of pleats to seal against at least one of an upper surface or a rear surface of the vehicle when the vehicle engages the seal.

10. The dock apparatus of claim 9, wherein at least one of the plurality of pleats or the plurality of loops extends at least partially across an entire length of the seal.

11. The dock apparatus of claim 9, wherein the plurality of loops cause the pleats to project in an outward direction away from the first pliable cover.

12. The dock apparatus of claim 9, wherein the seal includes a heading having a compressible foam core positioned within the first pliable cover.

13. The dock apparatus of claim 9, wherein the seal includes a curtain.

14. A dock apparatus subject to a penetrating force exerted by an upper edge of a vehicle parked at a doorway of a wall, the dock apparatus comprising:
 a support panel extending lengthwise along the doorway; and
 at least one of a curtain or a header pad to be suspended from the support panel and configured to be engaged by the vehicle, the at least one curtain or header pad having a plurality of flexible loops and a plurality of pleats overlapping the plurality of loops, at least one of the plurality of pleats or the plurality of loops extends across only a portion of a length of the seal, the plurality of loops to impart a force to the plurality of pleats when the vehicle is in engagement with the plurality of pleats to enable the plurality of pleats to seal against an upper surface of the vehicle.

15. The dock apparatus of claim 14, wherein the plurality of pleats provide a tight seal against the upper surface of the vehicle when the vehicle engages the at least one curtain or header pad to restrict weather elements from passing through the doorway.

16. The dock apparatus of claim 15, wherein the plurality of flexible loops urge the plurality of pleats away from the at least one of the curtain or the header pad when the at least one curtain or header pad is not engaged by the vehicle.

17. The dock apparatus of claim 16, wherein the plurality of loops are to urge the plurality of pleats against the upper surface of the vehicle when the vehicle engages the at least one curtain or header pad.

\* \* \* \* \*